(12) United States Patent
Shavit

(10) Patent No.: US 12,434,084 B2
(45) Date of Patent: Oct. 7, 2025

(54) COMMUNITY OUTDOOR FIRE DEFENSE

(71) Applicant: WATER-DOME LTD., Karmei Yosef (IL)

(72) Inventor: David Shavit, Kermei Yosef (IL)

(73) Assignee: WATER-DOME LTD., Kamei Yosef (IL)

( * ) Notice: Subject to any disclaimer, the term of this patent is extended or adjusted under 35 U.S.C. 154(b) by 523 days.

(21) Appl. No.: 17/801,274

(22) PCT Filed: Feb. 22, 2021

(86) PCT No.: PCT/IL2021/050204
§ 371 (c)(1),
(2) Date: Aug. 22, 2022

(87) PCT Pub. No.: WO2021/165972
PCT Pub. Date: Aug. 26, 2021

(65) Prior Publication Data
US 2023/0211194 A1 Jul. 6, 2023

Related U.S. Application Data

(60) Provisional application No. 62/980,164, filed on Feb. 22, 2020.

(51) Int. Cl.
*A62C 3/02* (2006.01)
*A62C 35/64* (2006.01)
(Continued)

(52) U.S. Cl.
CPC .......... *A62C 3/0214* (2013.01); *A62C 3/0271* (2013.01); *A62C 35/64* (2013.01);
(Continued)

(58) Field of Classification Search
None
See application file for complete search history.

(56) References Cited

U.S. PATENT DOCUMENTS

| 5,931,233 A | 8/1999 | La Bonte et al. |
| 7,797,116 B2 * | 9/2010 | Berezowski ........... A62C 37/50 702/182 |

(Continued)

OTHER PUBLICATIONS

Ronan et al. "London's burning: integrating water flow rates and building types into fire risk maps", International Journal of Emergency Services, Mar. 3, 2016. Retrieved on May 19, 2021. Retrieved from <URL:https:Ilresearchportal.port.ac.uklportallfiles/3641302/Londons_burning.pdf> entire document, 27 pages.

(Continued)

*Primary Examiner* — Jason Lin
(74) *Attorney, Agent, or Firm* — The Roy Gross Law Firm, LLC; Roy D. Gross

(57) ABSTRACT

A system and methods are provided for community outdoor fire protection comprising: receiving indicators of a current fire, and responsively determining a level of the current fire risk for each of multiple endpoints of a shared water supply; determining a relative duty cycle for operating each endpoint according to a fire risk; receiving a water pressure measurement of the shared water source and determining a maximum number of concurrent endpoints to operate; accordingly allocating operation of each endpoint to a set of time slots; and activating the multiple endpoints to turn on respective water flows according to the time slot allocation.

17 Claims, 23 Drawing Sheets

(51) Int. Cl.
*A62C 37/40* (2006.01)
*G08B 17/00* (2006.01)
*G08B 29/18* (2006.01)
*G08B 31/00* (2006.01)

(52) U.S. Cl.
CPC ............ *A62C 37/40* (2013.01); *G08B 17/005* (2013.01); *G08B 29/188* (2013.01); *G08B 31/00* (2013.01)

(56) References Cited

U.S. PATENT DOCUMENTS

| | | | | |
|---|---|---|---|---|
| 8,733,155 | B2* | 5/2014 | Hill | A01G 25/16 |
| | | | | 239/63 |
| 9,074,784 | B2* | 7/2015 | Sullivan | F24F 1/0007 |
| 9,175,864 | B2* | 11/2015 | Yun | F24D 3/02 |
| 9,569,945 | B2* | 2/2017 | Zumsteg | G08B 29/04 |
| 10,331,148 | B2* | 6/2019 | Jebran | F17D 3/01 |
| 10,665,074 | B1* | 5/2020 | Kausek | B05B 3/021 |
| 2004/0163827 | A1 | 8/2004 | Privalov et al. | |
| 2005/0183773 | A1* | 8/2005 | Sinclaire | E03B 7/04 |
| | | | | 137/357 |
| 2005/0273279 | A1* | 12/2005 | Faltesek | A62C 99/009 |
| | | | | 702/51 |
| 2008/0103768 | A1* | 5/2008 | Berezowski | A62C 37/50 |
| | | | | 704/233 |
| 2010/0070097 | A1* | 3/2010 | Morgenstern | A62C 35/64 |
| | | | | 700/283 |
| 2010/0071917 | A1* | 3/2010 | Lalouz | A62C 3/0214 |
| | | | | 169/60 |
| 2020/0154655 | A1* | 5/2020 | Dick | A01G 25/092 |

OTHER PUBLICATIONS

Antunes et al. "Low-Cost System for Early Detection and Deployment of Countermeasures Against Wild Fires", 2019 IEEE 5th World Forum on Internet of Things (WF-IoT), Jul. 22, 2019. Retrieved on May 19, 2021. Retrieved from <URL:https:Ilwfiot.jkjmanagement.comipapersl1570514396.pdf> entire document, 8 pages.

International Search Report and Written Opinion of PCT/IL2021/050204 Completed May 19, 2021; Mailed Jun. 28, 2021 7 Pages.

* cited by examiner

Fig. 14

COMMUNITY OUTDOOR FIRE DEFENSE

CROSS REFERENCES TO RELATED APPLICATIONS

This application is a U.S. national phase entry of, and claims priority to, PCT International Patent Application No. PCT/IL2021/050204, which claims priority to U.S. Provisional Patent Application No. 62/980,164, filed Feb. 22, 2020. The entire contents of the above-referenced applications and of all priority documents referenced in the Application Data Sheet filed herewith are hereby incorporated by reference for all purposes.

FIELD OF THE INVENTION

The present invention generally relates to the field of fire protection and containment, in particular for area conflagrations.

BACKGROUND

Wildfires are a major worldwide threat to populated areas near forests or fields, especially during hot, dry, and windy conditions. When such conditions are prevalent, fire suppression by fire fighters is difficult if not impossible, and conflagrations may continue to burn until the weather changes or combustible resources are exhausted.

Large buildings and buildings made of wood typically have indoor fire protection system, but outdoor fire protection systems are not prevalent. Irrigation systems for protecting individual homes and gardens are known in the art. Such systems may succeed in protecting a house even when surrounding houses are burnt in a wildfire.

However, water irrigation systems for fire protection a) require a very high water rate of flow, and b) require sufficient water pressure to be effective. Consequently, a community water grid may fail if all buildings operate with independent irrigation systems. In addition, such systems must be automated, as residents are typically evacuated when a fire is dangerously close. These shortcomings and others are addressed by embodiments of the present invention.

SUMMARY

Embodiments of the present invention provide a system and methods for community fire protection, including implementing steps of: receiving indicators of a current fire, and responsively determining a level of the current fire risk for each of multiple endpoints, wherein each endpoint includes a water gun and an associated electrical water valve, wherein a predetermined minimum water pressure is specified for operation of each water gun, wherein each electrical water valve connects to a shared water source, and wherein a shared water source has a limited water pressure. Steps may also be implemented including determining a relative duty cycle for operating each endpoint, according to the current fire risk of each endpoint, and determining a maximum number of concurrent endpoints to operate, according to a water pressure measurement and a predetermined minimum water pressure specified for each endpoint operation. Steps may further include: allocating operation of each endpoint is allocated to time slots, according to the maximum number of operational endpoints and the relative duty cycles of each endpoint; and operating an electrical water valve of each of the multiple endpoints, according to the endpoint's time slot allocation.

In some embodiments, the shared water source may be a cluster water source of a first cluster, and the first cluster may be one of multiple clusters receiving water from a shared primary water distribution system (WDS). The method may further include determining a limit of the WDS water pressure and responsively merging the multiple clusters to allocate operation of each endpoint of the multiple clusters to time slots.

In some embodiments, allocating operation of each endpoint to a time slot may further include allocating endpoint operation according to a maximum time limit between periods of endpoint operation. Further embodiments may provide steps of receiving new indicators of a current fire, and responsively determining new relative duty cycles. Embodiments may further include re-allocating operation of each endpoint to the time slots of operation.

Further embodiments may include receiving a new water pressure measurement, responsively determining new relative duty cycles, and responsively re-allocating operation of each endpoint to the time slots of operation.

Receiving indicators of the current fire may include receiving data on a location of the current fire with respect to geographic coordinates of the endpoints, and determining the current fire risk of each endpoint comprises determining the risk as a function of distance to the current fire. Alternatively or additionally, receiving indicators of the current fire may include receiving data on fuel, topography, and one or more types of meteorological data including temperature, humidity, wind speed, and direction, and determining the current fire risk of each endpoint comprises determining the risk by applying the indicators to a fire prediction model.

In some embodiments, steps of the method are executed by a remote processor. Alternatively or additionally, steps may be performed by dedicated processors associated with each endpoint.

Endpoints may further include a source of additive, and the method may include operating the additive source to add the additive to water flow of an endpoint. The method may also include providing operational data with respect to the endpoints to one or more monitoring devices, such as a smartphone, a computer tablet, a cellular phone, a desktop computer, or a laptop computer. The operational data may include a real-time aggregate measure of water consumption.

The method may also include providing a control interface to one or more control devices, and receiving from the control interface an instruction to alter a current fire risk of one or more of the endpoints.

In some embodiments, the relative duty cycle is proportional to the current fire risk. The current fire risk of the endpoints may be a numerical value that ranges from a first value indicative of a smallest risk of the endpoint catching fire, up to a highest value of the range indicative of a high risk of the endpoint catching fire.

A period of a time slot may be approximately a time required for a 360 degree revolution of a water gun. In some embodiments, a time slot period may be between ½ and 4 minutes.

BRIEF DESCRIPTION OF DRAWINGS

For a better understanding of various embodiments of the invention and to show how the same may be carried into effect, reference will now be made, by way of example, to the accompanying drawings. Structural details of the invention are shown to provide a fundamental understanding of the invention, the description, taken with the drawings, making apparent to those skilled in the art how the several forms of the invention may be embodied in practice. In the figures:

FIGS. 10-14 indicate how duty cycles for water gun operation may be configured, to schedule water gun operation, in accordance with an embodiment of the present invention;

DETAILED DESCRIPTION

Embodiments of the present invention provide a system and methods for community outdoor fire defense (COFD). A community as described herein is typically a residential or business area of multiple dwellings. It is to be understood that the processes and systems described herein may also be applied to any grouping of buildings or dwellings or other valuable structures, typically in proximity to an area of natural vegetation, such as a forest, which has a high mass of combustible material, i.e., "fuel" for a potential conflagration.

In a typical COFD configuration, multiple buildings are protected by a fire defense irrigation system that utilizes water guns to douse their surroundings. Hereinbelow, the term water gun refers to any device known in the art capable of spraying water to significant distances, at high flow rates. Water guns appropriate for residential and commercial building and surrounding area protection may include outdoor irrigation systems often used in agriculture. A commercial water gun that may be employed, for example is the NaanDanJain 280 PC high power agricultural sprinkler, manufactured by NaanDanJain Irrigation Ltd. Such water guns can typically eject water to distances of 20 meters and beyond, at water nominal rates of flow around 25 m$^3$/hr (110 gallon/min). Typically, a minimum flow of water would be 10 m$^3$/hr. Water guns employed in the COFD system typically rotate at least 180 degrees, and more commonly a full 360 degrees.

Figure 1:
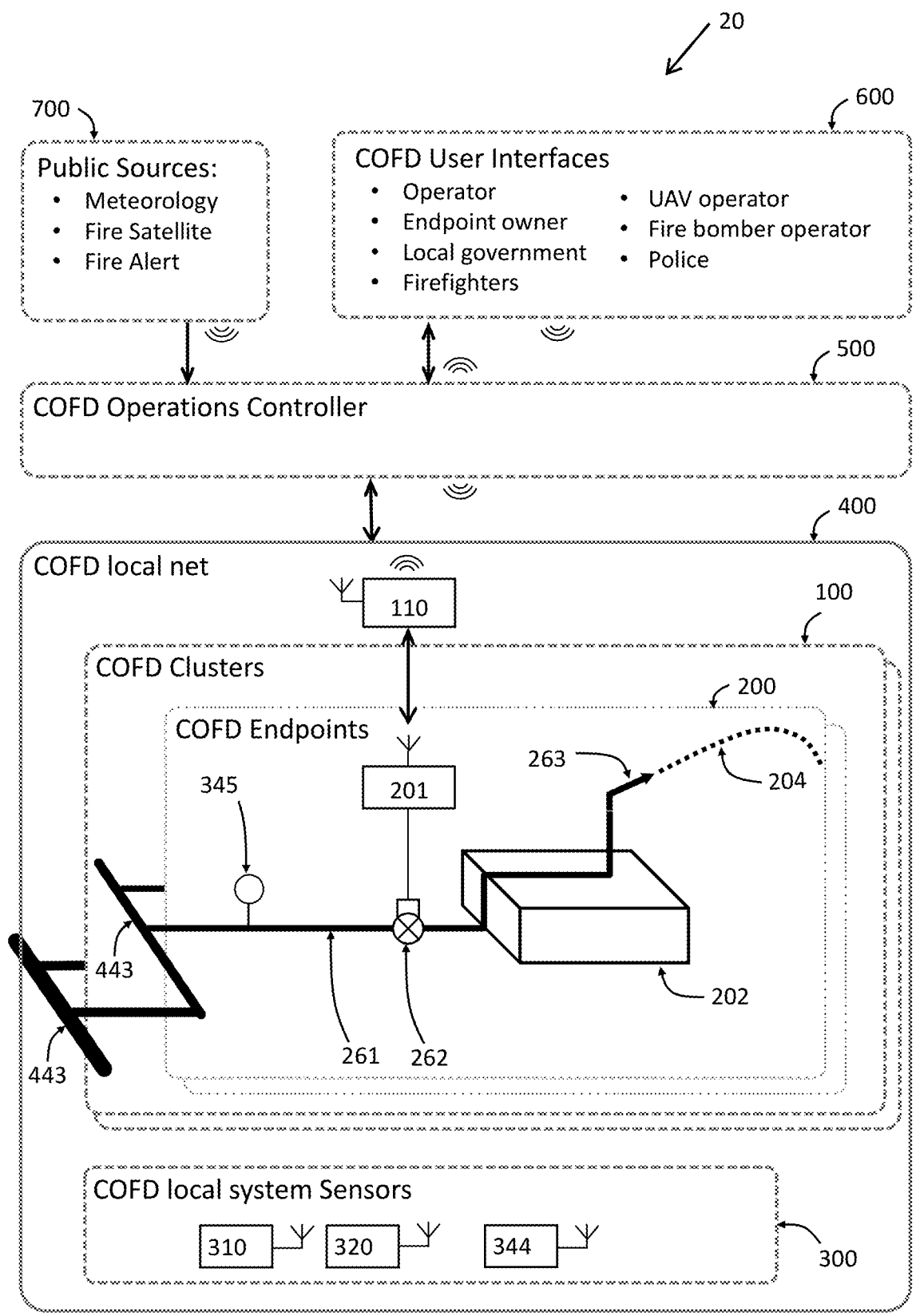
FIG. 1 is a schematic block diagram of main subsystems of a Community Outdoor Fire Defense (COFD) system, in accordance with an embodiment of the present invention.

FIG. 1 is a schematic block diagram of subsystems of a COFD system 20, in accordance with an embodiment of the present invention. The COFD system protects a community 400 (also referred to herein as a "local system") that is supplied by a water distribution system (WDS) 442. Water of the WDS is distributed to one or more COFD clusters 100, each of which includes multiple COFD endpoints 200. The COFD local system 400 also include a set of fire sensors and water pressure sensors 300, indicated as sensors 310, 320, and 344, described further hereinbelow. Additional subsystems of the COFD system may include a COFD operations controller 500, a set of user interfaces 600, and public data sources 700.

A COFD endpoint 200 is typically a home or business, typically located on a lot with some surrounding public or private land. A COFD cluster 100 is a neighborhood of such endpoints that share a common water supply network, indicated as a cluster water network 443. The cluster water network 443 is assumed to be able to supply a limited water flow, at a pressure level that is dependent on the flow rate of water provided to the given COFD cluster 100. That is, the water availability is assumed to be relatively constant so as to enable water distribution planning within the given COFD cluster. The COFD local system 400 may include multiple clusters, which may be treated independently for the purpose of water distribution planning, as long as the total supply limitation of each cluster does not exceed the supply limitation of the WDS. (When the WDS limit would be exceeded by individual usage of each cluster, the entire community 400 may be viewed as a single cluster in the water scheduling processes described below).

Each endpoint 200 includes a water gun 263, as described above, which is typically mounted to a roof of a building or platform 202. Typically, the location of the water gun is determined as the center of an area (e.g., a commercial or residential lot) including a building and its surrounding area. When the surrounding area includes trees, the water gun may be installed on a pole to enable dousing of the treetops. As described above, the water gun typically is configured to rotate, such that ejected water 204 covers a full or partial circular area.

The water gun 263 is connected to the cluster water network 443 by a dedicated pipe 261, which typically has a diameter greater than a typically residential water feed (i.e., 2-3 inches instead of 1-0.75 inches). In addition, the dedicate pipe typically does not have a flow meter, which would reduce the water pressure.

Operation of the water gun 263 may be controlled by two valves. One valve is a manual valve 264 that is closed under normal conditions in order reduce the risk of water wasted by an unintentional glitch. When there is a fire alert, the manual valve is opened manually. The manual valve is typically located at the edge of the property encompassing the endpoint, close to the connection to the cluster water network 443, in order to enable authorized personnel to operate the manual valve 264 when residents of the home have left.

A second valve is an electrically controlled water gun valve 262. (The water gun valve is typically electrically or hydraulically operated.) As described hereinbelow, the water gun valve is controlled by a COFD application, which manages the distribution of water to all endpoints connected to the cluster network 443. The COFD application may be executed either by a centralized controller, such as the operations controller 500, or by distributed controllers. A hybrid combination of a centralized controller with distributed functions may also be implemented, as described further hereinbelow. The operations controller may be located at a data center that is remote from the COFD local system 400, and which may be operated as a cloud computing system.

In the configuration shown in FIG. 1, an endpoint controller 201, connects the water gun valve 262 to a COFD local system controller 110. The COFD local system controller 110 may in turn be connected to the COFD operations controller 500, which may be located remotely. The endpoint controllers 201 may connect to the operations controller 500 by means of the COFD controller 110 if direct communications between 201 and 500 is unreliable as may be the case during a fire. Alternatively, the endpoint controllers 201 may be connected directly to the operations controller 500. Communications between the controllers may be implemented, for example, by cellular, RF, or cable connections, and may include operation by interne protocols. In some embodiments, the various sensors and control elements (e.g. valves) may communicate with the COFD application by a LoRaWAN protocol, and the endpoint controllers 201 may serve the role of LoRaWAN gateways. In further embodiments, the endpoint controllers 201 may local system controller implement functions of a distributed COFD application. Additionally or alternatively, the local system controller 110 may implement some or all functions of a distributed COFD application. These and additional implementations are described further hereinbelow.

The COFD application processes real time data indicative of relative fire risks faced by the multiple endpoints and indicative of the water resource availability, in order to allocate water efficiently between endpoints. As described further hereinbelow, risks may be determined by fire prediction models known in the art. Some of the fire prediction data is provided by the set of local sensors 300, which may include local fire sensors, meteorological sensors, and water pressure sensors, indicated in the figure as respective sensors 310, 320, 344, and 345, and described further hereinbelow.

These sensors, like endpoint controller 201, may communicate with the COFD application by wired or wireless means, communicating either directly, or through the local system controller 110, or directly to the operations controller 500 (in a centralized implementation of the COFD application).

Additional real time data may be received by operations controller 500 from one or more of the public data sources 700, which may include, for example, regional meteorology sources, drought status sources, fire alert data broadcasts, fire location coordinates, fire location maps, air and space photography, and fire progress estimations. An example of a reliable fire data source is the U.S. Fire Administration (FEMA).

The COFD user interfaces 600 may include interfaces to a system operator, endpoint owners (e.g., homeowners), local government authorities, firefighters, drone operators, fire bomber operators, and police. These interfaces are typically web browser and/or mobile app interfaces, which send and receive data from respective web server and/or app server engines implemented on the COFD operations controller 500. Authorized users, such as a system operator, may have access to screens of the user interface permitting entering instructions to control aspects of the COFD application. Other users may receive monitoring information, which may include a tactical situation display (TSD) which may include a map showing the community protected by the COFD system in relation to the fire. More details on these interfaces are provided hereinbelow.

Figure 2:
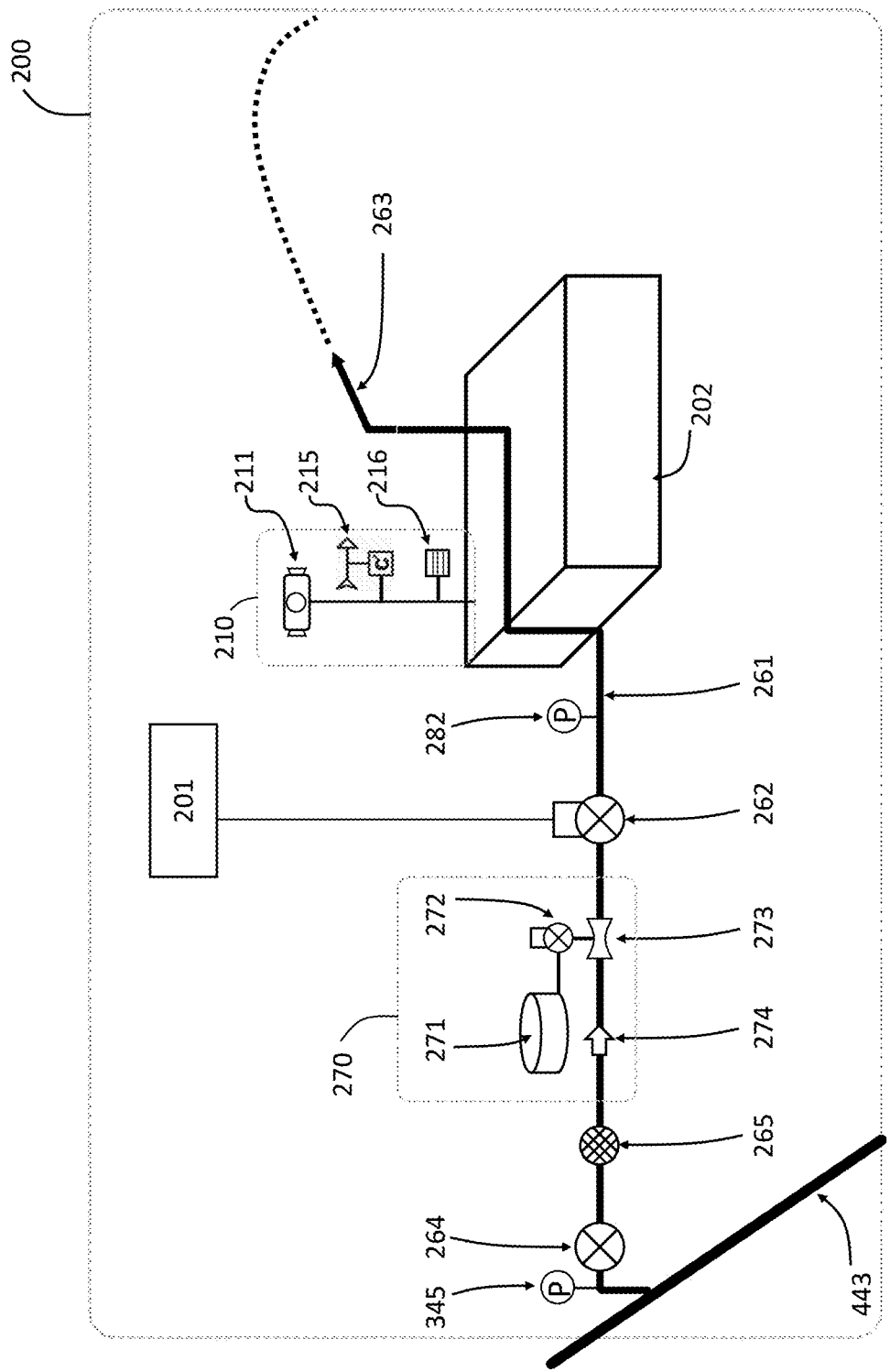
FIG. 2 is a schematic diagram of an endpoint of a COFD system, in accordance with an embodiment of the present invention.

FIG. 2 is a schematic diagram of an endpoint 200 of the COFD system, showing additional elements that may be part of an endpoint system.

Endpoints may include a group of real-time, endpoint sensors 210. Some or all of these endpoint sensors may be deployed in an integrated mini-meteorological unit. These endpoint sensors may include an endpoint visual sensor 211 (e.g., a CCD/IR sensor) for visually detecting fires (which provides indications of fire detection, location, and current fire intensity). Additional sensors may include endpoint meteorological sensors 215, for example for measuring wind, humidity, and temperature. A smoke and/or smell sensor (that detect fire gas products) 216 may also be employed. As described further hereinbelow, data from endpoint sensor may be supplemented by longer range sensors that are associated with the entire local system rather than with individual endpoints.

A cluster water pressure sensor 345 measures the pressure of the cluster water network 443, to determine the extent to which the cluster water network can provide sufficient water flow to operate the water guns of the system. Pressure sensor 282, (positioned after the water gun valve 262) provides an indication as to whether the water gun of a given endpoint and the water gun valve are operating properly. The pressure sensor 282 provides measurements that may be transmitted to the COFD application by any of the communications means described above. A water filter 265 is also typically provided along water pipe 261.

Fire suppression and/or inhibiting additives can be added to the water. Available additives enable longer protection from ignition and can increase time between irrigations and reduce amount of water needed. An additive subsystem 270 is shown. Such a subsystem typically requires a one-way valve 274 to reduce the risk of additives entering the water network pipe 443. Also included is an additive mixer 273 that adds the correct percentage of fire additive (usually 2-3%), together with an additive valve 272 to vary the additive flow. The additive valve may also be controlled by the COFD application, which may communicate control signals to the valve by any of the communications means described above. An additive container 271 may be provided with a minimal volume of about 3 gallons.

Figure 3:
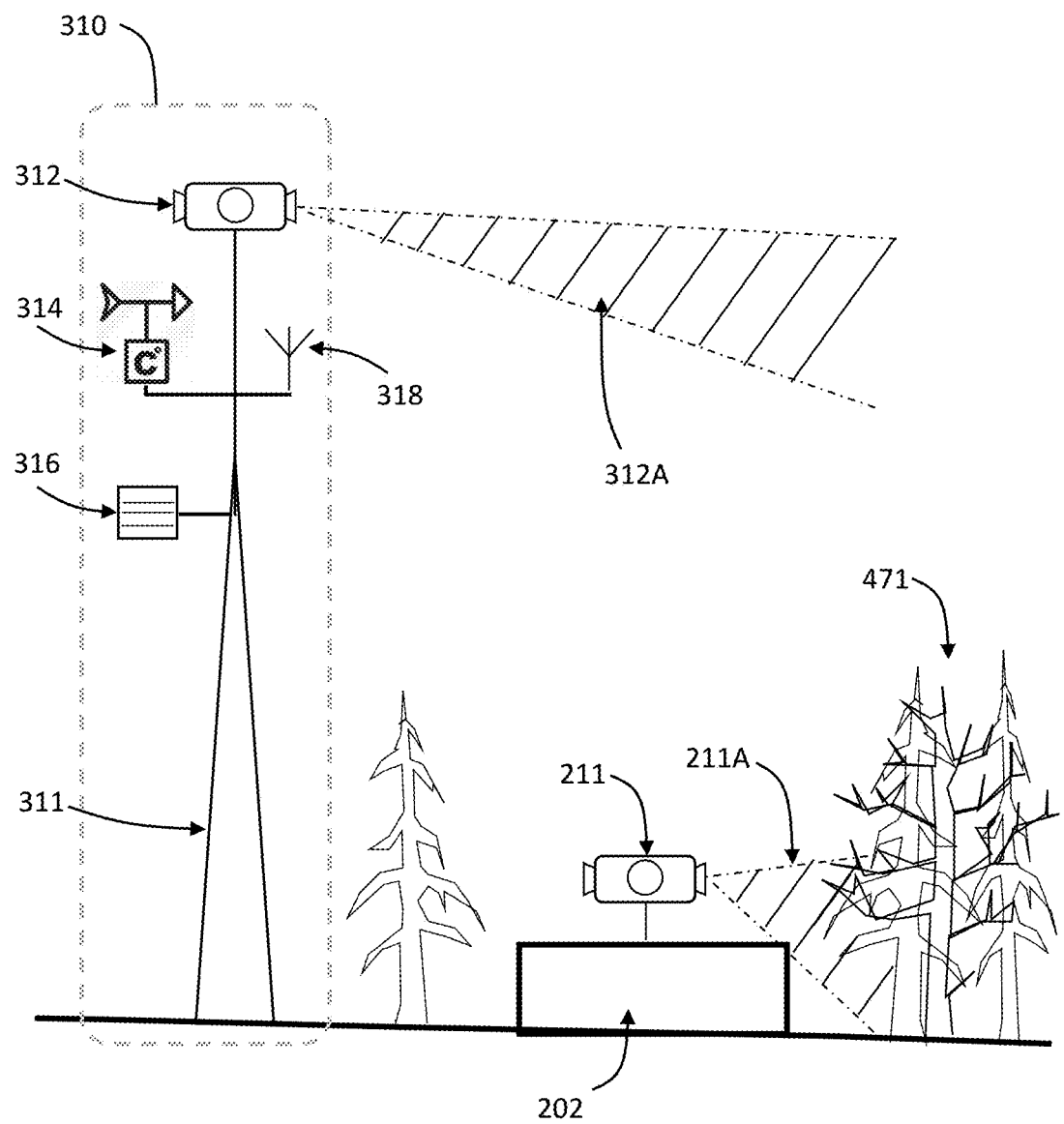
FIGS. 3-5 are schematic diagrams of additional sensor configurations in a COFD system, in accordance with an embodiment of the present invention.
Figure 4:
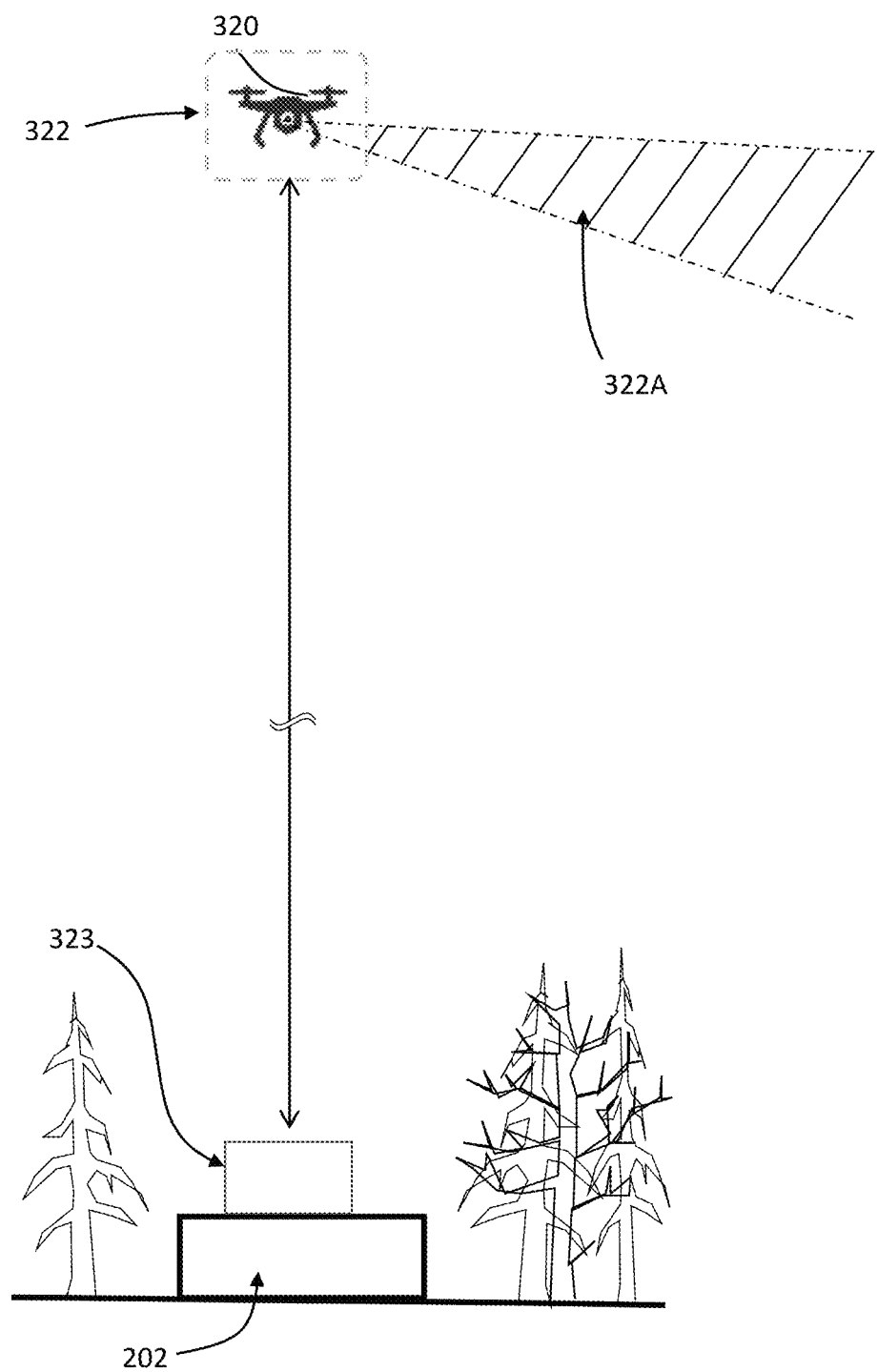
Figure 5:
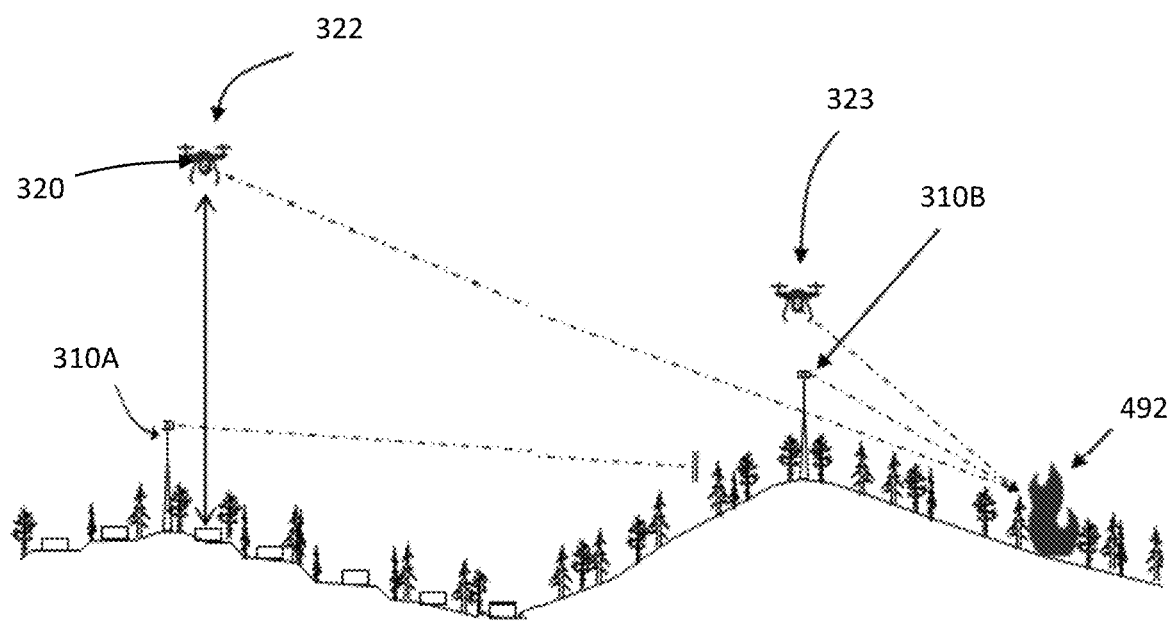

FIGS. 3-5 are schematic diagrams of additional sensor configurations in a COFD system, in accordance with an embodiment of the present invention. FIG. 3 shows two different types of sensors (e.g., CCD/IR sensors) in the system, an endpoint sensor, e.g., a visual sensor 211, as described above, and a long range sensor tower 310. The endpoint visual sensor 211 is typically mounted on a building 202 of the endpoint area and has a range of view 211A that may be blocked from sensing at a distance, for example because of nearby trees 471 or due to sloping topography. By contrast, the long range sensors are mounted at greater heights in order to sense fire indicators at greater ranges, such as at distances of several kilometers. A high tower or pole 311 may serve as the base for such long range sensors (which may be, for example, a cellular phone antenna). These long range sensors may include a visual sensor 312 (e.g., CCD/IR sensors), having a field of view (FOV) (range 312A. Other sensors may include a meteorological sensor 314 and a smoke or smell sensor 316. These sensors, like other sensors of the system, connect to system controllers (such as controllers 201 or 110, or operations controller 500) by wireless or wired means, such as a sensor controller 318. A COFD local system may employ three such long range sensor towers 310, such that data from the respective long range sensors may be triangulated to calculate positions of detected fires.

FIGS. 4 and 5 are schematic depictions of an unmanned aerial vehicle (UAV) 320 equipped with one or more of the sensors described above, in order to sense fire indicators at greater distances. As shown in FIG. 4, the UAV 320 is shown as flying at a high observation point 322, to achieve a long range field of view (FOV) 322A. The FOV 322A is much greater than the FOVs of the endpoint or tower-mounted sensors, especially as the UAV 320 may also be programmed or manually controlled to move closer to a location of a fire. UAVs may be automated to rise from a base station 323 to the height 322 when a fire alert is issued by the COFD application.

FIG. 5 shows a COFD system in an area of hilly terrain, such that sensors of a long range sensor tower 310A cannot sense beyond a nearby hill to a location 492 of a more distant fire. Solutions for long range detection include positioning a second long range sensor tower 310B at the top of the neighboring hill, or employing the UAV 320, which could either be operated to rise above its base to the high observation point 322, or to fly to a closer position, indicated as a far observation point 323.

Figure 6:
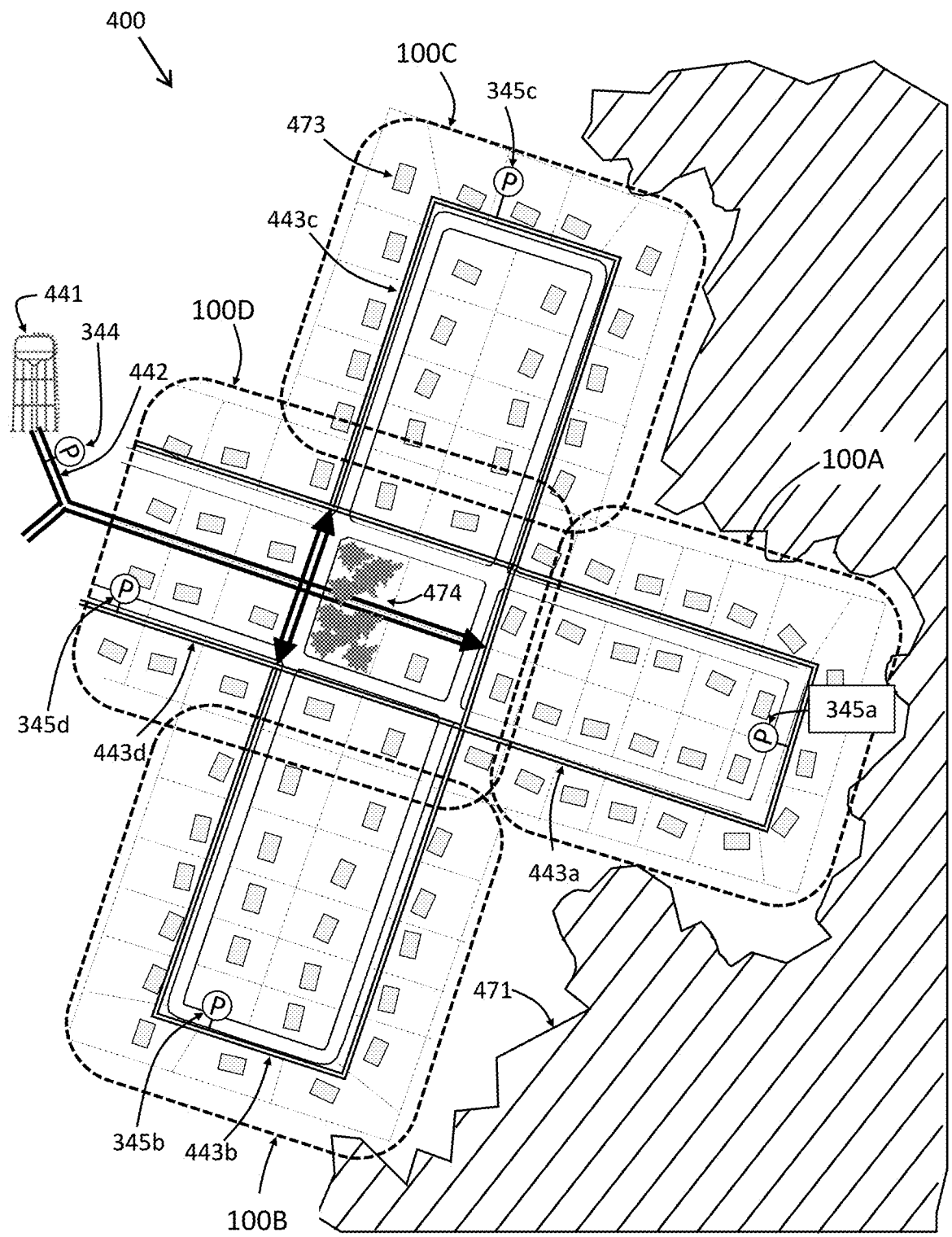
FIGS. 6-7 depict maps showing aspects of a community protected by a COFD system, in accordance with an embodiment of the present invention.
Figure 7:
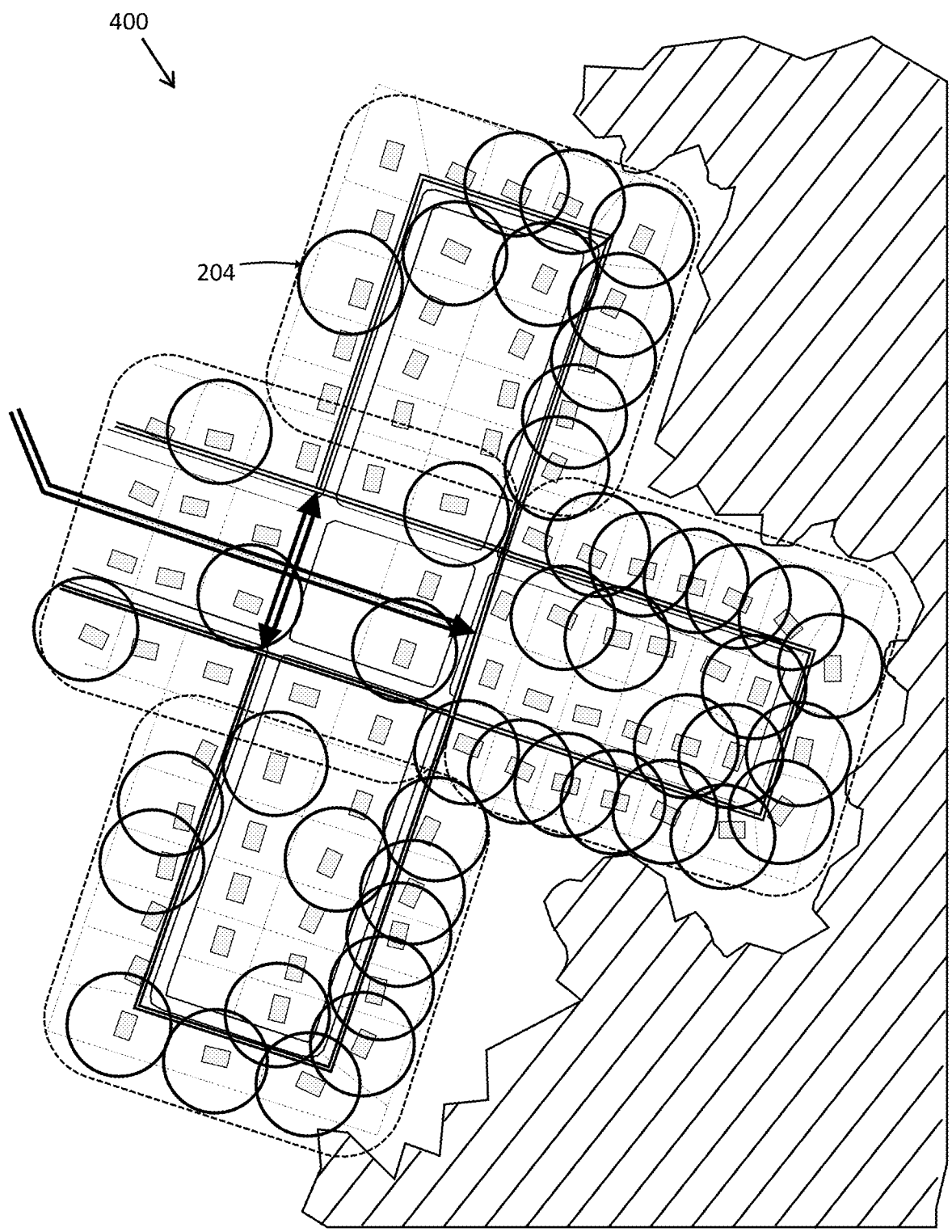

FIGS. 6-7 depict maps showing aspects of an exemplary community 400 protected by a COFD system. The community is located near a fire hazard area 471, such as a forest. Houses or buildings (or other types of water gun platforms) are indicated as buildings 202. The community receives water from the WDS 442, described above, which may for example, receive water from a regional water reservoir 441 or other large water storage tank. The WDS water supply is distributed to separate clusters 100, indicated as 100A, 100B, 100C and 100D, each having a respective cluster water network, indicated respectively as 443A, 443B, 443C, and 443D. Cluster water network pipes are typically narrower than the prime water supply pipes of the WDS. Cluster water network pressure sensors are indicated respectively as 345A, 345B, 345C, and 345D. A pressure sensor of the WDS is indicated as sensor 344.

FIG. 7 illustrates, by circles, the coverage of water 204 for each of the endpoints 200. As described above, the coverage of each water gun is typically a full 360 degrees. Such coverage reduces the chance of fires being ignited by sparks (i.e., airborne embers) that can travel in the wind from the fire and can land behind buildings that face a fire.

In typical configurations, not all water guns are operated simultaneously. For example, the distribution pipes of the local water networks may have 4 inch diameters that can support pressures of about 50 psi at maximum flow rates of 75 m3/hr (330 GPM). Cluster 200A includes 20 water guns, each requiring a flow of 15 m3/hr 66 GPM) in order to operate according to the required operational parameters (e.g., to reach the desired radius of water coverage). This coverage may require 50 psi to be effective. If all of the guns worked simultaneously, the required flow would be about 1,320 GPM, much more than could be supplied by the pipes feeding the cluster. In other words, if all endpoints are activated, the pressure will fall to a level that will prevent proper operation of all endpoints. In order to function, the water guns must receive sufficient pressure. This is only possible if the number of concurrent water guns operating is limited based on the maximum flow that the water network can provide (while maintaining the necessary water pressure). For the example given, if the water network can maintain a maximum flow rate of 75 m3/hr, and the 18 water guns each require a flow of 15 m³/hr, then the water network can only operate five concurrent water guns. In embodiments of the present invention, water flow is allocated by determining appropriate duty cycles of operation for the water guns and by assigning the periods of water gun operation to time slots, such that in any given time slot, no more than a maximum number of guns are operating.

It should be noted that water flow of local systems may be affected by other events and parameters, such as: (a) utilization of water by nearby clusters; (b) utilization of water by firefighters; and (c) home water usage (for example if residents forget water running when evacuated). Consequently, water pressure of the water network must be measured in real time, in order to determine the maximum number of concurrent water guns that can be operated effectively. Aspects of the present invention provide a process for determining the number of guns that may be operated simultaneously and for allocating water to all water guns in an intermittent manner. The allocation is based on determining operating duty cycles for the water guns and scheduling the duty cycles according to time slots.

Figure 8:
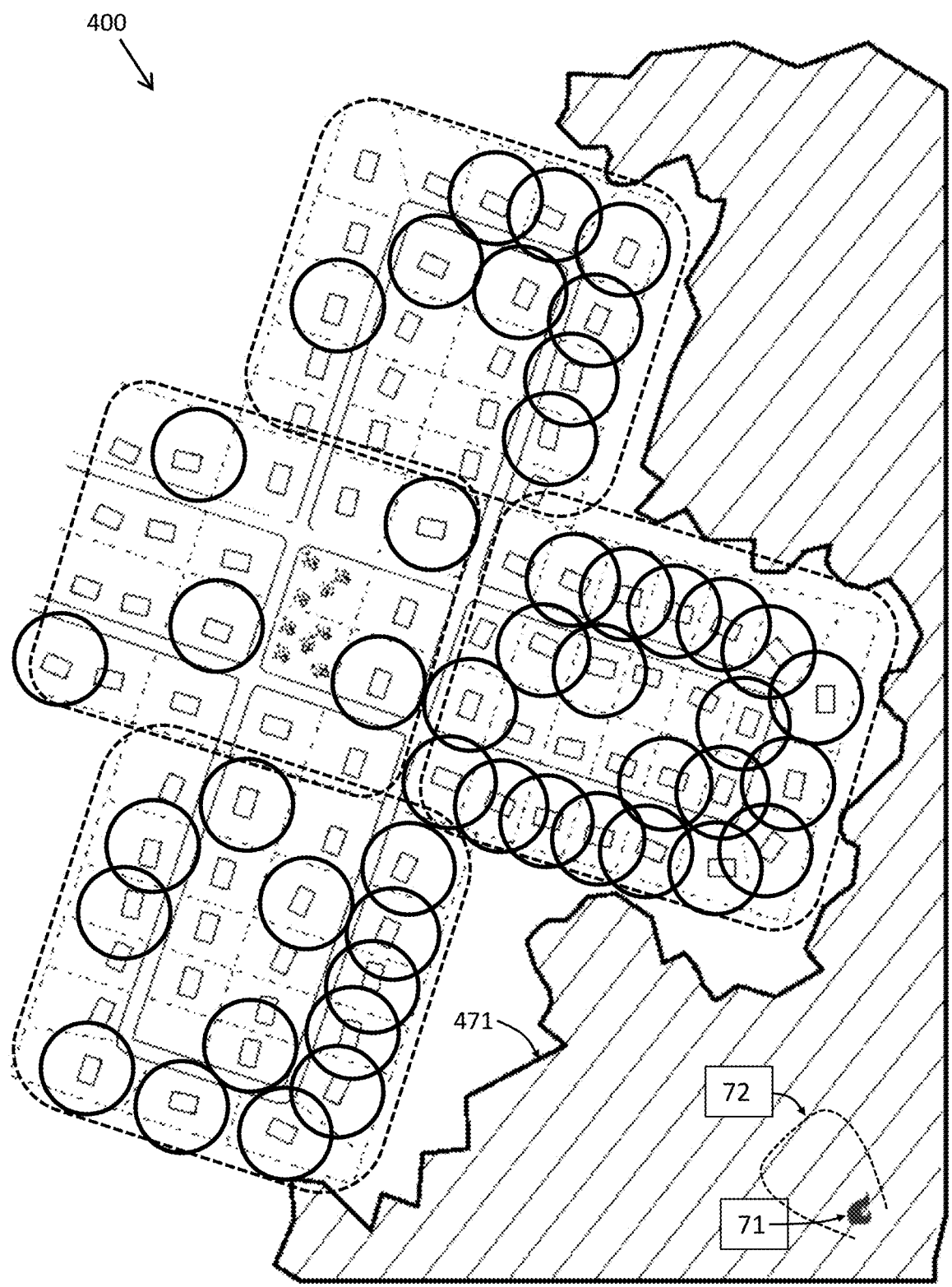
FIGS. 8, 9A and 9B depict maps of a community protected by a COFD system, indicating aspects of COFD system operation when a fire risk exists, in accordance with an embodiment of the present invention.
Figure 9A:
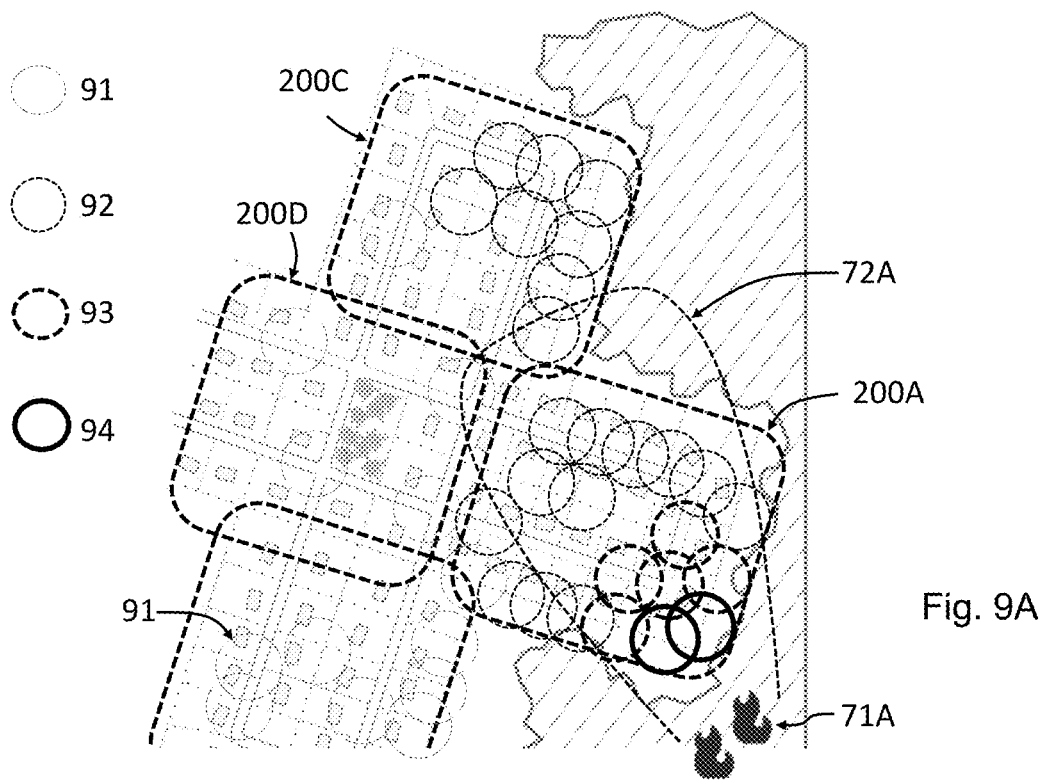
Figure 9B:
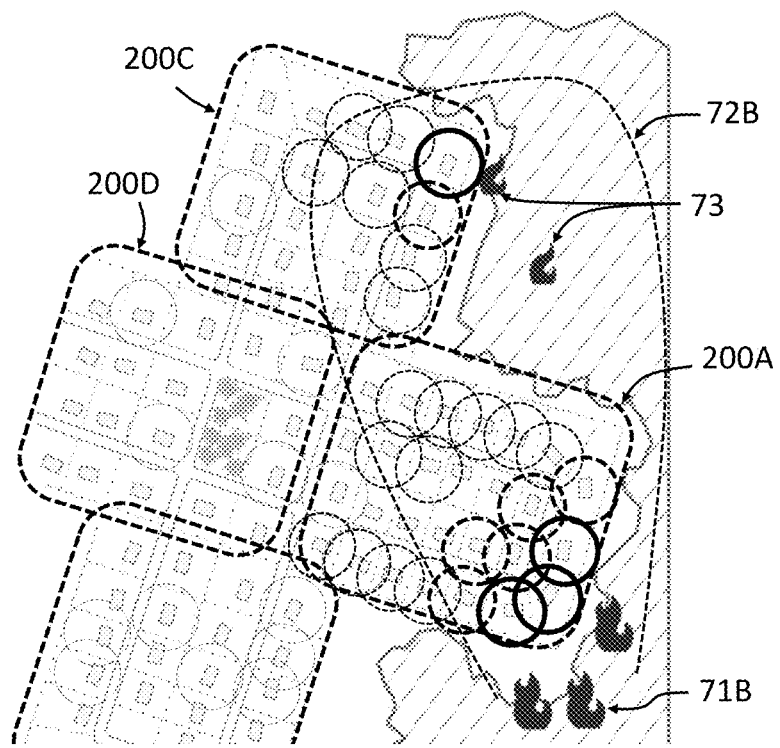
Figure 10A:
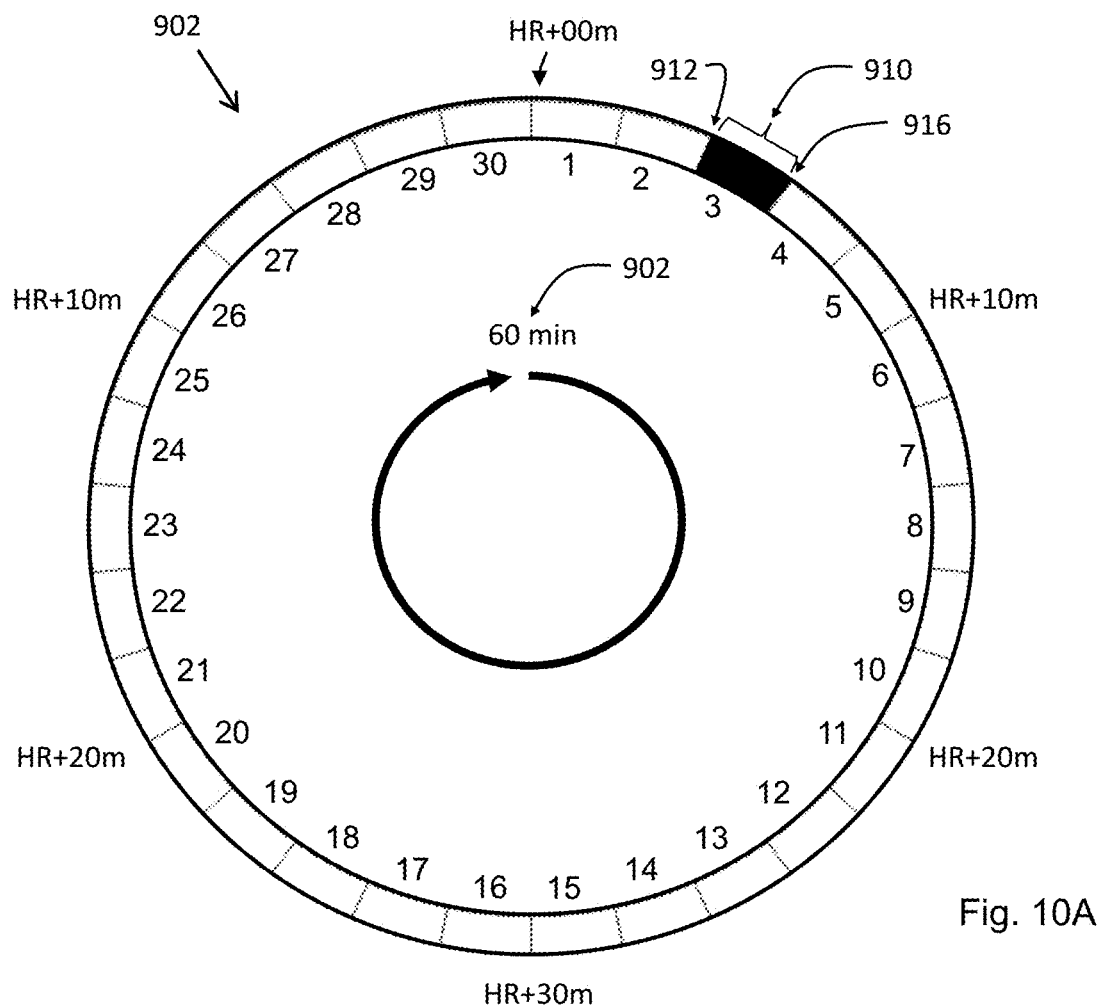
Figure 10B:
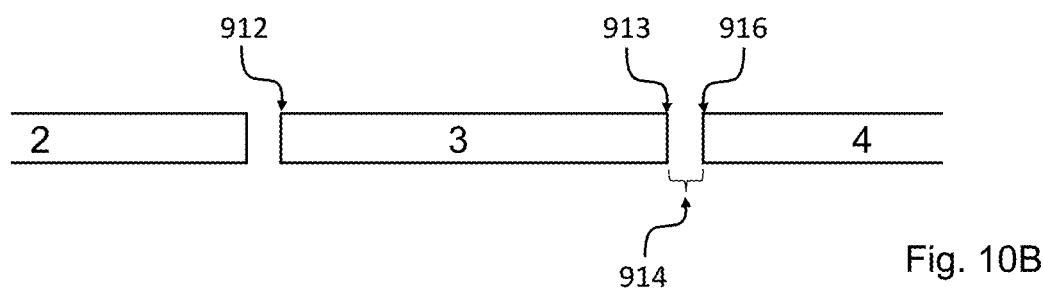

FIGS. 8, 9A and 9B depict maps of a community 400 indicating aspects of COFD system operation when a fire 71 breaks out in a nearby fire hazard area 471 (i.e., the neighboring forest). FIG. 8 shows the fire 71 as being relatively small and at a sufficient distance from the community, such that the expected risk to the community is still low, in terms of risk parameters (as calculated by fire prediction models described further hereinbelow). One such risk parameter is the predicted range of ember ignition, indicated as ignition range 72. A second parameter of risk is the expected "time to impact" (TTI) typically meaning the time for the fire to reach the community in a worst case scenario.

In such a situation, the COFD application may be set to include a threshold for early operation, for example, starting operation of water guns only when the TTI is less than 3 hours. If the TTI and other parameters of fire danger do not warrant start of operation, the COFD application may set an "initial" operating mode. In the initial mode, various steps of preparation may be initiated, for example alerts may be issued to open the manual valves, UAVs may be operated, and sensor data may be collected more frequently to ensure that all sub systems are operational.

In addition, in the "initial" mode, all endpoints may be activated in a round-robin scheme, whereby all endpoints have the same duty cycle rate (i.e., they all have the same ratio of active and non-active operation) Because of the limited capacity of the cluster water networks, no more than a given maximum number of water guns are operated concurrently in any given cluster. The early operation irrigates the areas to be defended, improving the resistance of trees, gardens, and structures to ignition. The "initial" mode can be modified as the area becomes sufficiently drenched with water to provide fire resistance. If the fire remains a present but not an immediate threat, the COFD application may then reduce the water flow to a "maintenance mode." This change to a maintenance mode may be made after a preset number of active time slots, for example 8 time slots (a number that may be changed by the COFD application according to the meteorology parameters). The gradual application of water in advance of an immediate danger is important to (a) prevent large amounts of water from being wasted, and (b) improving resistance while keeping most water resources in reserve in case they are needed if the risk increases. As the fire approaches and the risk level increases, the COFD application may gradually increase water gun duty cycles to increase the level of resistance.

FIGS. 9A and 9B show scenarios in which the fire becomes an immediate threat to the community, warranting implementation of an "impact" mode of operation. At this point, risks to endpoints may be differentiated. and the COFD application in response to individual risks sets differing endpoint priorities. This means that different duty cycles may be assigned to the operation of different endpoints, with higher duty cycles assigned to endpoints facing higher risk. In FIG. 9A, the fire (indicated as 71A) is at the edge of the community cluster 200A, and the ignition risk area (indicated as 72A) covers most of cluster 200A and part of cluster 200C. The endpoints in these areas therefore have higher priorities. In an exemplary embodiment, four endpoint priority levels are indicated as circles 91, 92, 93, and 94, in order of increasing priority (e.g., priority levels, corresponding to risk levels, of low, medium, high, and critical). In FIG. 9B, the fire (indicated as 71B) at the edge of the community has expanded, and the ignition risk area (indicated as 72B) covers not only most of cluster 200A but also most of cluster 200C. Consequently, more endpoints now have a higher priority. Note that sparks have already ignited additional areas of the area indicated as an ignition risk. It is to be understood that priority levels may be divided into more levels. Moreover, each priority level typically reflects a given range of risk levels. Risk levels reflect risks of ignition that are typically calculated by a fire prediction model of the COFD application (based on 3D maps, fuel status, and real time sensor data received by the application, including fire location, wind direction, temperature, humidity and current fire intensity). Priority levels may be relative, i.e., reflecting a relative risk to different endpoints, such that priority of an endpoint may not change even when the risk to a community increases. Priority levels are typically correlated with irrigation duty cycles, which may increase as the risk to a community increases.

FIGS. 10-14 indicate how duty cycles may be determined for water guns, and how duty cycles may be allocated to time slots of operation. In FIG. 10A, the circle 902 represents an hour, which is divided into 2 minute time slots 910 (each start of operation for a time slot indicated as 912). The time period of the time slots may be configured to correspond to the period of rotation of the water guns. When switching between water guns, there is a time gap between the end of effective operation of one gun and the start of effective operation of the next gun (i.e., they cannot both be operating concurrently at the required flow rate), a two minute time slot would typically be configured when the period of rotation is slightly faster. FIG. 10B shows a transition between time slot 3 and time slot 4, showing that the effective operation of time slot 3 ends at time 913, the effective operation of time slot 4 begins at time 916, and there is a brief pause in effective operation during time period 914.

The start of the hour is indicated as "HR+00", where "00" indicates 0 minutes past the hour.

Figure 11:
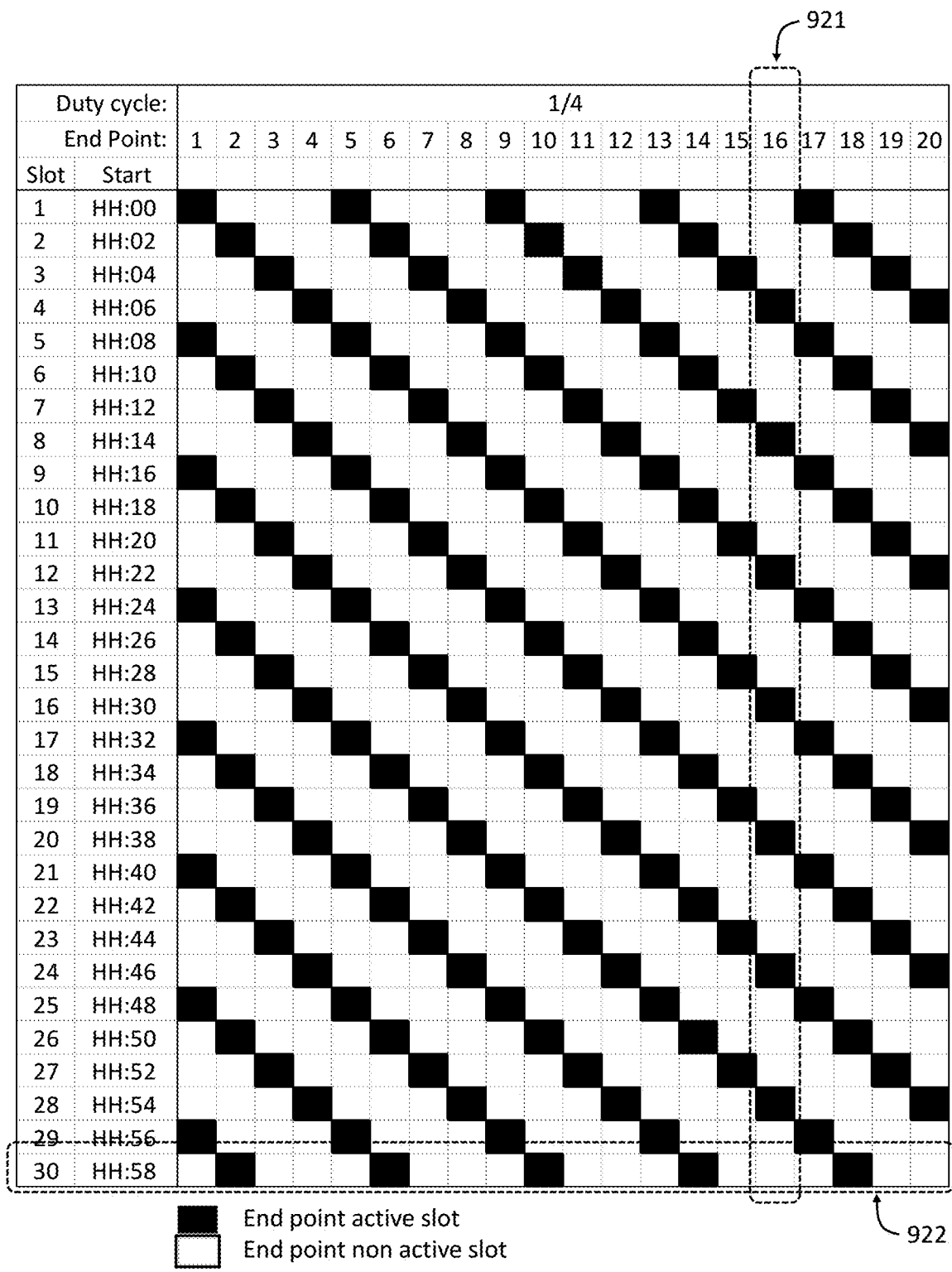

FIG. 11 presents a table showing a time slot schedule of water gun operation. The operation of each water gun is indicated by columns 921 of the table, and the time slots are indicated as rows 922. The schedule shown would be a typical schedule generated by the COFD application for the early warning mode of operation ("initial mode") illustrated in FIG. 8, described above. All endpoints have the same priority and are therefore operated with the same duty cycle, which is set to ¼ (meaning once for every four time slots). Note that for the 20 endpoints shown, only 5 are operated concurrently during any one time slot period. The limit of 5 concurrent operating water guns is determined by the cluster water network supply limit. If the limit permits more water guns to be operated concurrently, the COFD application may operate concurrently the most water guns possible (i.e., the most possible in any given time slot, as described below). A larger number of concurrently operating water guns may improve performance, reducing the time needed to achieve ignition resistance.

Figure 12:

FIG. 12 presents a table showing a time slot schedule that shows a reduced duty cycle for water gun operation, relative to the schedule presented in FIG. 11. Such a reduction may be appropriate for the "maintenance mode" after an impact mode for early irrigation has succeeded in sufficiently irrigating the designated area. Note that the duty cycle for each water gun is ⅛.

Figure 13:
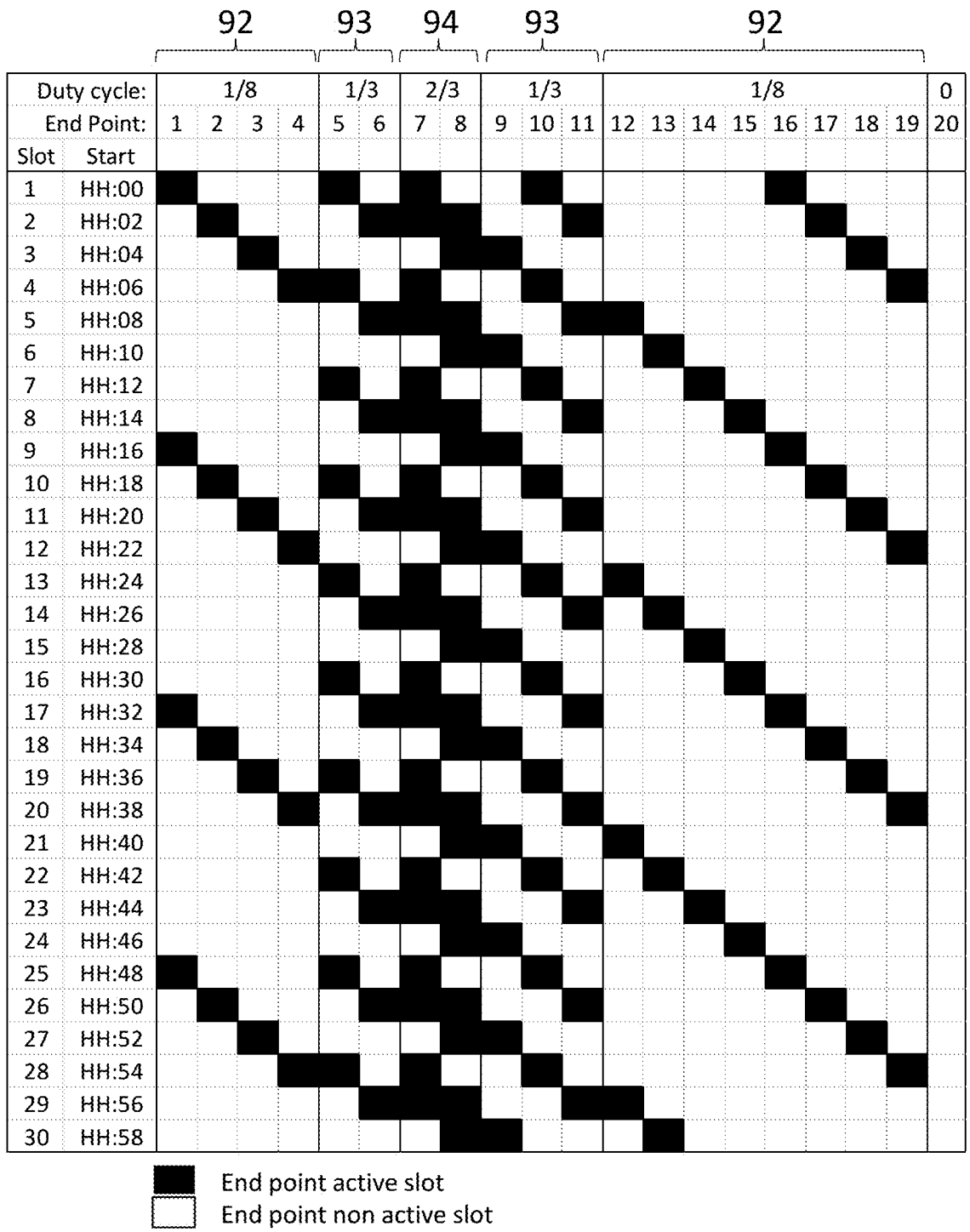

FIG. 13 presents a table showing a time slot schedule that may be generated by the COFD application for the impact mode of operation described by FIG. 9A, above. As the fire approaches the community, different priorities are calculated for different endpoints, and these priorities are translated to duty cycle variations. For the three operational priority levels 92, 93, and 94 (medium, high and critical) three respective duty cycles are calculated, these being ⅛, ⅓, and ⅔ respectively. No water is allocated to low priority endpoints or to endpoints that may have failed in an off position. Note that there are 16 endpoints assigned duty cycles of ⅛ time slots; there are 5 endpoints assigned duty cycles of ⅓ time slots; and there are 2 endpoints assigned duty cycles of ⅔ timeslots. These duty cycle levels are calculated by the COFD application to ensure that water flow does not exceed a limit of 5 concurrent operational water guns. (Calculation of the limit for this example is: $16*⅛+5*⅓+2*⅔=5$.) Typically, the COFD application determines appropriate, relative duty cycle values for endpoints, given current priorities and risk levels, and then "normalizes" the relative duty cycles to ensure that the limit on concurrent operation is not exceeded. For example, if the preferable, relative duty cycles for the given level of risk in the example had been 50% higher, e.g., $3/16$, ½, and 1, respectively, these levels would result in an average concurrent operation of 7.5 water guns. (Calculation: $16*3/16+5*½+2*1=7.5$.) Consequently, each duty cycle level is reduced by dividing the duty cycle by a "k factor," where the k factor is the sum of the desired duty cycles divided by the limit. In the example this would be 7.5/5 (i.e., division by 1.5). In other words, when the k factor is greater than one, the duty cycles need to be corrected (i.e., normalized) to permit operation within the constraint of the limited water network supply. Note that the above calculation assumes that the necessary flow for all water guns is the same. (If water guns are configured to require different water flow levels, the same calculation may be applied, but the duty cycle correction must include a water flow factor of each gun.)

Figure 14:
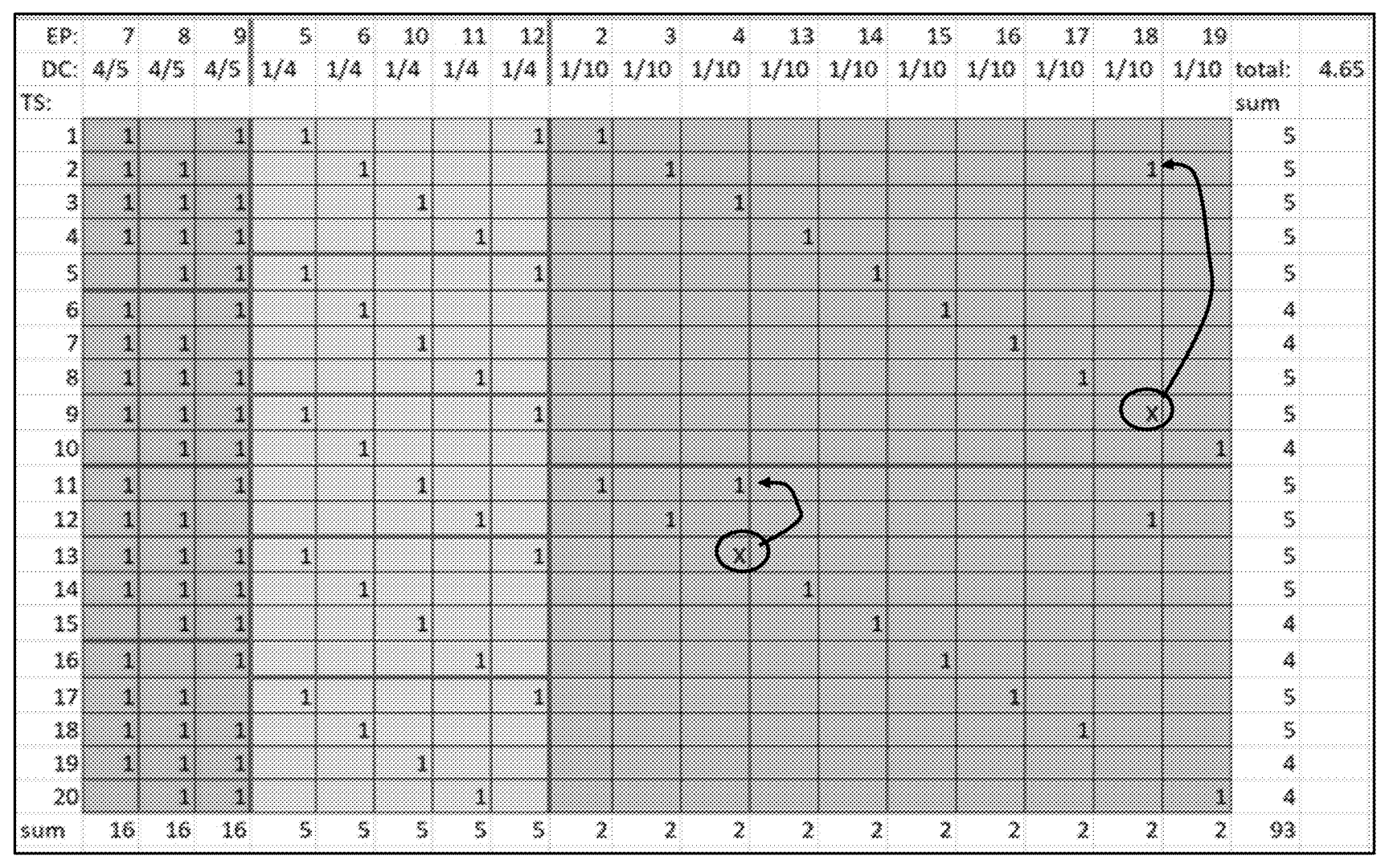

FIG. 14 presents a table indicating a scheduling heuristic that may be applied by the COFD application to allocate the corrected duty cycles to time slots. The scheduling process is typically performed frequently during the impact mode of operation, as the community faces a moving fire conflagration that may warrant changing endpoint priorities. The scheduling heuristic proceeds by determining a schedule for individual endpoints one at a time, in an order determined by the priority of endpoints, from highest priority to lowest priority. The table of FIG. 14 has the same layout as the schedules shown in FIGS. 11-13, with rows indicating time slots, and columns representing activation schedules for individual endpoints. The endpoints indicated by columns are shown grouped according to their priority level. In the example shown, three endpoints are shown as having the highest priority ("critical" priority), with a duty cycle of ⅘; five endpoints are shown as having a lower priority, with a duty cycle of ¼; and ten endpoints are shown as having a third priority level, with a duty cycle of 1/10. Endpoints with lower priority that do not warrant activation, as well as failed endpoints, are not included in the scheduling. The sum of all the duty cycles is shown as being 4.65, meaning that with proper scheduling no time slot needs to have more than 5 concurrent active endpoints.

The scheduling example shown could be a scheduling performed for the scenario described by FIG. 9B, above, in which several endpoints face a high, immediate fire threat. However, the heuristic described is appropriate for any scheduling of any impact mode operation, which may also set more or fewer priority levels. Scheduling is performed for a block of time slots that represent the least common denominator (LCD) of the multiple priority levels. In the example shown, the duty cycles are $4/5$, $1/4$, and $1/10$, for which the LCD is 20. Once scheduling is completed for a block of 20 time slots, this schedule may be repeated for all subsequent series of 20 time slots, until the schedule is changed.

Scheduling starts with the first endpoint (indicated as endpoint 7) by interspersing active and non-active time slots for an initial sub-block of time, where the ratio of active to non-active in the sub-block is set according to the duty cycle, and where the sub-block size is set by the denominator of the duty cycle. For the given example, the duty cycle is $4/5$ and the denominator is 5, so the sub-block size is 5. As shown, the first sub-block of endpoint 7 is scheduled with 4 active states (indicated by "1") followed by one inactive state. If the duty cycle had more than one inactive state, the block would be scheduled with interspersed active and non-active ("on" and "off") states. Interspersing ensures that an endpoint facing a high risk is inactive for the minimum amount of time required by its duty cycle.

After the first sub-block is scheduled for the first endpoint, the sub-blocks of the remaining endpoints of the highest priority are scheduled one time slot at a time. Scheduling of these subblocks is performed such that for each time slot, there are no more inactive slots than there are for the duty cycle of the given priority. That is, for example, if there were 5 endpoints of the given priority, with a duty cycle of $4/5$, each time slot would have only one inactive slot across the 5 endpoints. Dispersing the inactive slots of each duty cycle across different time slots also guarantees that no time slot has more active endpoints than allowed by the cluster water system limit (which, in the example shown, is a maximum of 5 endpoints).

After all endpoint time slots are set for the first sub-block, this sub-block is copied to the rest of the block (in this case, the block of 20 time slots).

Next, scheduling proceeds with the first sub-block of the endpoints of the next priority. In the example shown, this sub-block has 4 time slots, reflecting the LCD of the duty cycle of $1/4$. As shown, the active state of endpoints with this priority is switched on one at a time for each of the first 4 timeslots, and the fifth endpoint (endpoint 12) is then set to also switch on in the first time slot. With each active assignment to a time slot, a check is made that the assignment does not exceed the cluster limit. If it does, the given endpoint assignment is moved to the first time slot of the sub-block that has an opening for an additional active state, as described further hereinbelow.

Once this sub-block is scheduled, it is also copied to the rest of the block. however, as opposed to the initial copying of the highest priority sub-block, the offsets between the different sub-blocks may cause a situation where active states of copied sub-blocks exceed the cluster limit. The solution for this situation involves moving these active states to different time slots. In the example shown, such moves are required for two assignments in the third priority group. One assignment switch is shown in the scheduling of the first sub-block, where an X in the column of endpoint 18 marks where an assignment was made according to the straightforward process of switching active states for each endpoint. This active state was moved from time slot 9 to time slot 2, which was the first time slot of the sub-block having an opening for an extra active state. The last column of the table shows the total number of active states for each time slot. After the switch for endpoint 18, both time slots 2 and 9 have 5 active states. When the first sub-block was copied, again because of the different number of time slots in each sub-block of each priority group, an additional conflict appeared for the scheduling of endpoint 4. Again, the scheduling of an active state in time slot 13 would have exceeding the cluster limit. The active state was moved to the first time slot in the sub-block with an opening, in this case time slot 11. As described above, once all time slots of the full LCD block are scheduled, the LCD block may be repeated indefinitely, without concern for exceeding the cluster limit, until conditions (or endpoint failures) warrant changing priorities. The heuristic described above ensures that even when an endpoint does not have a symmetric duty cycle, meaning that gaps between on states are not always equal, the gaps are never great than the length of two blocks. Alternate methods of dispersing active states among alternate time slots may also be employed when allocation according to symmetric duty cycles results in too many active states in a given time slot.

Note that despite the impending risk of the entire community, some endpoints may still be assigned a low priority, and a duty cycle of zero. It should be noted that endpoints may fail in the active state, meaning that they effectively have a duty cycle of 100%. These failures reduce the water pressure of the cluster water network, causing the COFD application to reduce the number of endpoints that can be scheduled.

FIGS. 15-22 are schematic block diagrams of computer modules of a COFD application, in accordance with an embodiment of the present invention.

Figure 15:
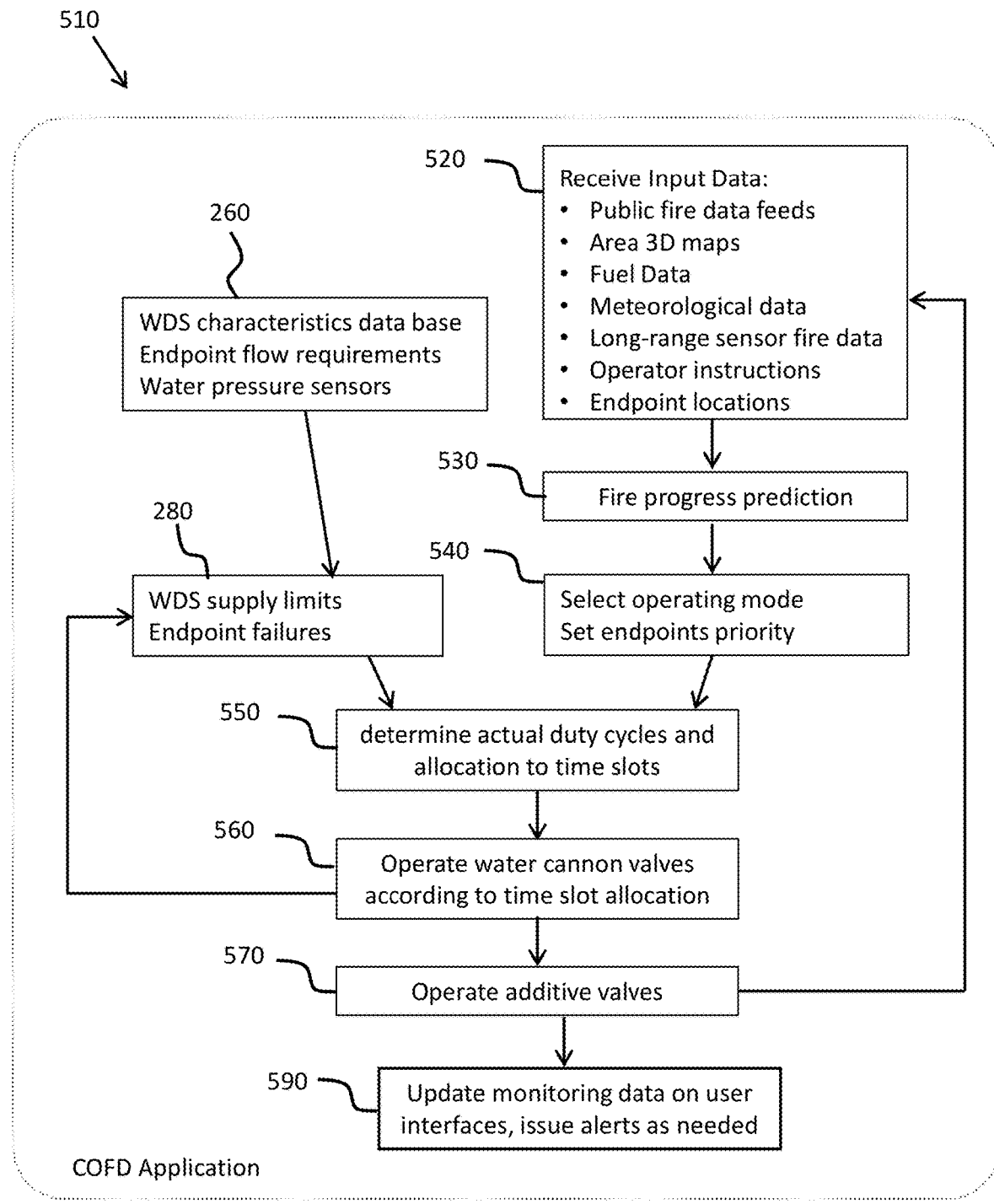
FIGS. 15-22 are schematic block diagrams of computer modules of a COFD application, in accordance with an embodiment of the present invention.

FIG. 15 is a flow diagram showing a general process 510 implemented by the COFD application. In a centralized model of operation, all steps of the process 510 are implemented by the COFD operations controller described above with respect to FIG. 1. In a distributed model of operation, one or more of the steps may be implemented by processors associated with the local system controller 110 and/or the endpoint controller 201. Examples of distributed models are described further hereinbelow. Process 510, like any alarm system, is typically initialized to run when there is no imminent threat, operating continuously to check whether or not a fire threat has appeared that requires a response. The steps of the process described below are steps that are performed iteratively and continuously.

At a step 520 of the process, the COFD application receives input data from the sensors and input sources indicated in FIGS. 1-2. This data may include: public data feeds; area 3D maps; fuel data; endpoint locations; operator instructions; and endpoint and long-range sensor data (meteorological, visual, water pressure, etc.). The use of this data in multiple subsequent steps of the process 510 is described below.

At a step 530, a fire progress prediction model is applied to the input fire and meteorological data to determine a time-to-impact (TTI) of a current fire. In addition, a danger level of the fire for the community may be determined. The danger level may be at the community level and/or at the resolution of each endpoint, if the TTI and the fire distance warrant such calculations, given application thresholds for TTI and fire distance. A block diagram of step 530 I/O is provided by FIG. 16, described hereinbelow.

At a step 540, based on the output generated at step 530, as well as on operational thresholds set by the application, the COFD application determines an appropriate mode of operation. The primary modes of operation, as described above, are initial, maintenance, and impact modes. In addition to setting the operating mode, the COFD application, at step 540, also sets priorities for the multiple endpoints, as well as corresponding relative water flow duty cycles for endpoints. Details of operation of step 540 are described further hereinbelow with respect to FIGS. 17-20.

In parallel with steps 520-540, the application at steps 260 and 280 respectively receives data with respect to the cluster water pressure limits and responsively calculates limits on the number of endpoints that can be active. In particular, at step 260, data such as WDS characteristics may be received from stored values (e.g., from a data base). Also data is received from the multiple WDS, cluster, and endpoint pressure sensors. Endpoint flow requirements are also provided at step 260 to step 280.

At step 280, from flow requirements per endpoint (entered into the system when water guns are installed), and from the measured network pressure, determined by sensors of the system described above with respect to FIGS. 1 and 2, the COFD application determines the current limit on the number of concurrent water guns that can be operated. The COFD application also determines whether endpoints have failed, based on anomalous pressure readings.

At a step 550, a corrected duty cycle is then calculated for each endpoint, and the duty cycles are allocated to time slots. Details of operation at step 550 are described above with respect to FIG. 14, and further hereinbelow with respect to FIG. 22.

At a step 560, the COFD application operates the water gun valves according to the time slot allocation. A schedule typically remains in effect until changed due to changing circumstances, such as changing endpoint risks (and therefore changing priorities), changing community risks (and therefore changing operational modes), or changing water network pressures (and therefore changing concurrent flow limits). As indicated in the figure, in parallel with on-going operation of the water guns, the process of acquiring data and determining the appropriate operating schedule continues.

As indicated in the figure, the parallel steps of acquiring pressure sensor readings and of determining fire risk are iterative steps. Pressure sensor readings continue to be taken by the COFD application (step 260) to confirm that water guns are operational and that there are no operating failures. Pressure sensor readings confirm the operation of water guns that have been activated, as well as those that have been deactivated. Data on operational status may be issued to end users, along with alerts if failures are identified (step 590). Also at a step 570, fire inhibiting and/or suppression additives may be added to the water, as determined by pre-determined schedules, which may also be risk dependent.

In some embodiments, operator instructions entered through the user interface 600 (received at step 520) may modify aspects of the operation of process 510. For example, an operator may be authorized to change an endpoint priority, or may directly shut off or turn on a water gun without regard for its priority or duty cycle.

As described above, some or all of the steps of process 500 may be performed in a distributed processing manner. For example, steps 530-560 may be performed by processors associated with individual endpoints, e.g., the endpoint controllers 201 described above with respect to FIG. 1. Each endpoint processer may perform the calculations required for global scheduling of all endpoints, and then apply the schedule determined for its own water gun to turn on and off its own water gun. To ensure correct synchronization of time slot allocation, cross checks between the endpoints may also be performed. A cross check can be done by sharing data, in particular the allocation schedules, between endpoint controllers. If schedules are different, they may be "harmonized," for example by redundant validation, whereby multiple endpoint calculations are compared and the calculations for which there is a majority (or plurality) are then determined to be correct and are implemented by all endpoints. Cross checking can be done after each step of the control process, including steps 520, 530, 540, and 550. This ensures a high level of redundancy for situation awareness, fire prediction, mode of operation and prioritization and irrigation planning. In such a configuration, the endpoint processors may still receive data (such as the public data) from the central, operational controller 500.

Figure 16:
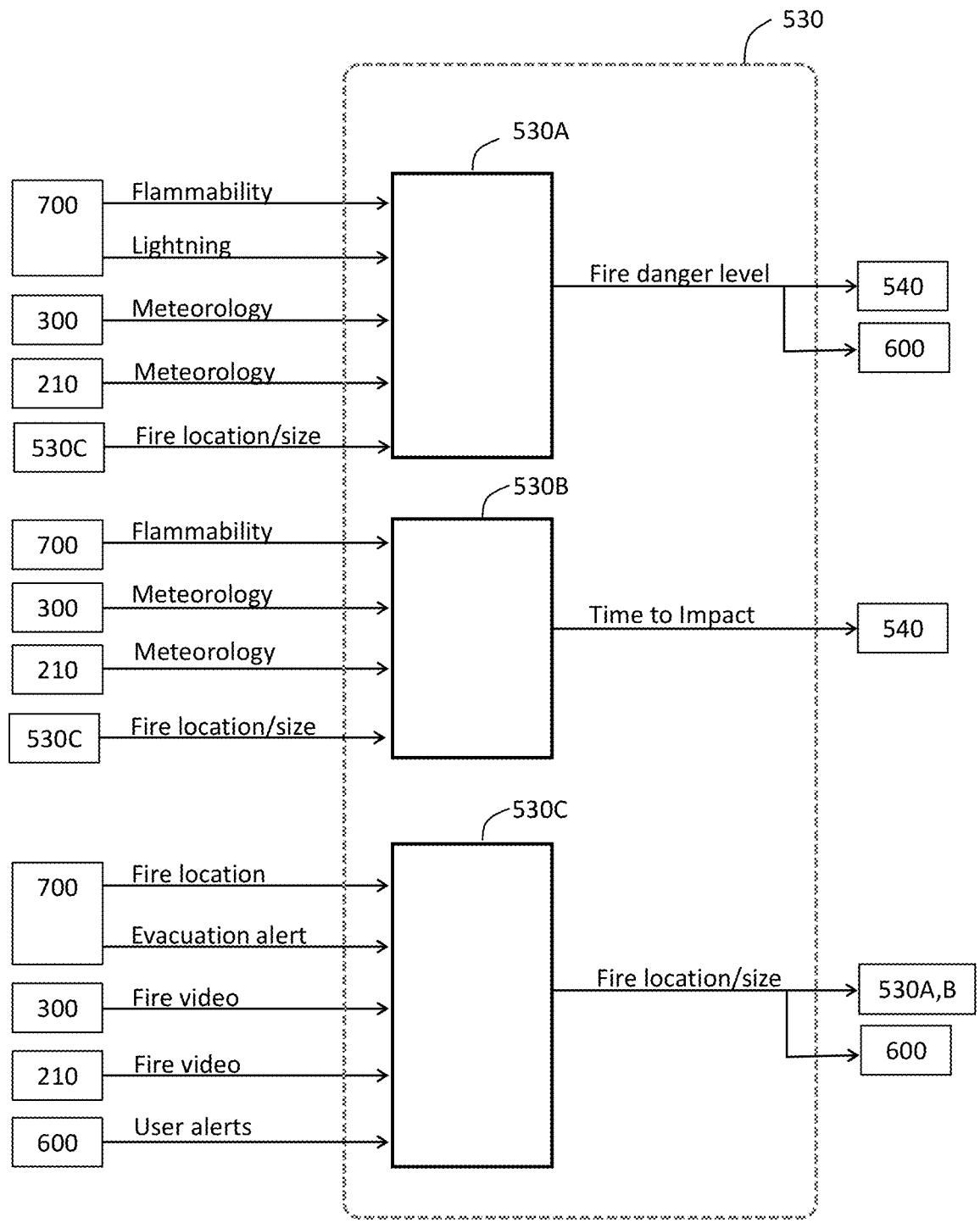

FIG. 16 shows details of the operation of step 530 of process 510 described above. Three modules of step 530, indicated as modules 530A, 530B, and 530C, respectively determine four outputs that may be generated at step 530: the fire danger, the TTI, the fire location and the fire size. As indicated in the figure, inputs to module 530A include data from the public data source 700, such as flammability of the fuel (i.e., dryness of the vegetation of the fire hazard area), and lightening conditions. Additional input may include meteorology data from the cluster and endpoint sensors 300 and 210 described above with respect to FIGS. 1-2. Module 530A applies the fire prediction model described above to the input data, calculating a fire danger to the community, which is then provided to step 540, and which is also provided with data to the user interface 600.

Inputs to the module 530B include data from the public data source 700, such as flammability of the fuel. Additional input may include meteorology data from the cluster and endpoint sensors 300 and 210 described above with respect to FIGS. 1-2 described. Module 530B applies the fire prediction model described above to the input data, to calculate a fire danger to the community, which is then provided to step 540.

Module 530C, which provides fire location and size output to modules 530A and 530B calculates the location and size from indicators provided both by public data sources 700 and from cluster and endpoint visual sensors 300 and 210. As described above, multiple camera data may also be triangulated by the COFD application, in order to estimate more accurately the fire location and size.

Figure 17:
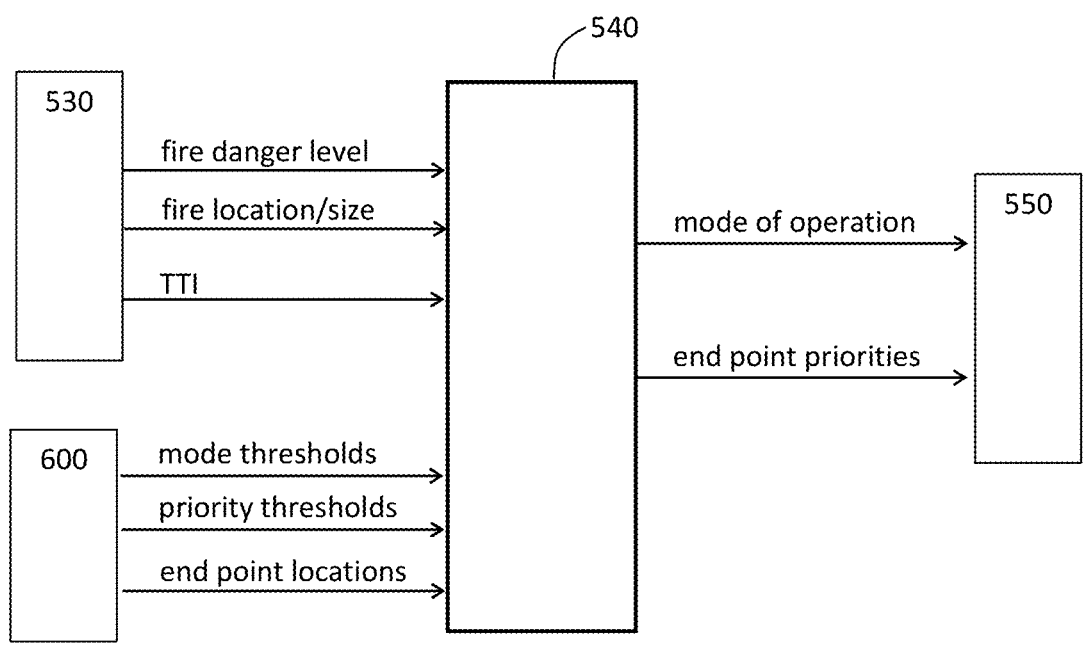

FIG. 17 shows details of the operation at step 540 of process 510 described above. Inputs to step 540 include the data output from step 530, including the calculated fire danger level, fire location and size, and time-to-impact. Step 540 applies this input to algorithms for calculating a mode of operation and priority levels of the endpoints, which are input to step 550. Additional input to step 540 includes preset parameters, including thresholds of fire danger, location and time, which are typically set by a system operator, through the user interface 600. These parameters are used for determining the mode and priority levels. Endpoint location data is also used to set priority levels per endpoint.

Figure 18:
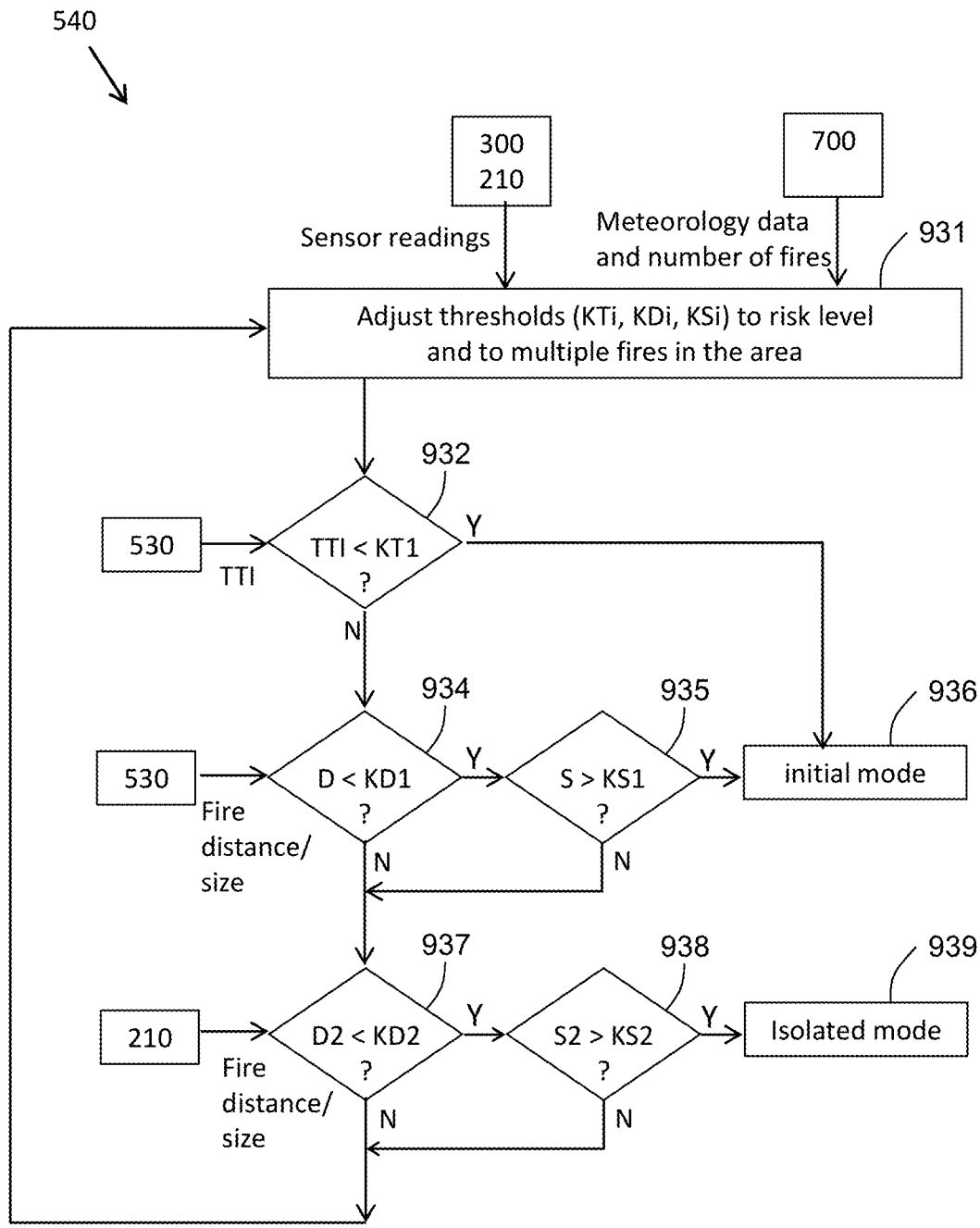
Figure 19:
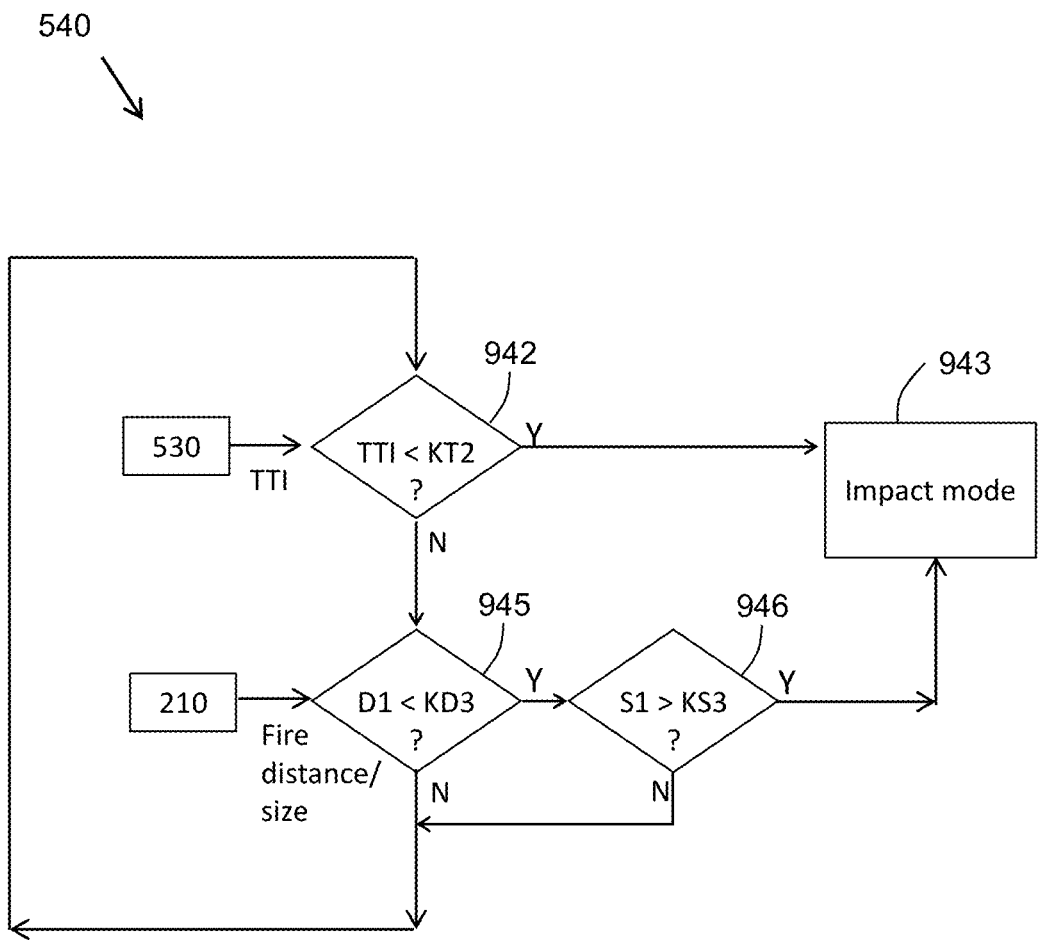
Figure 20:
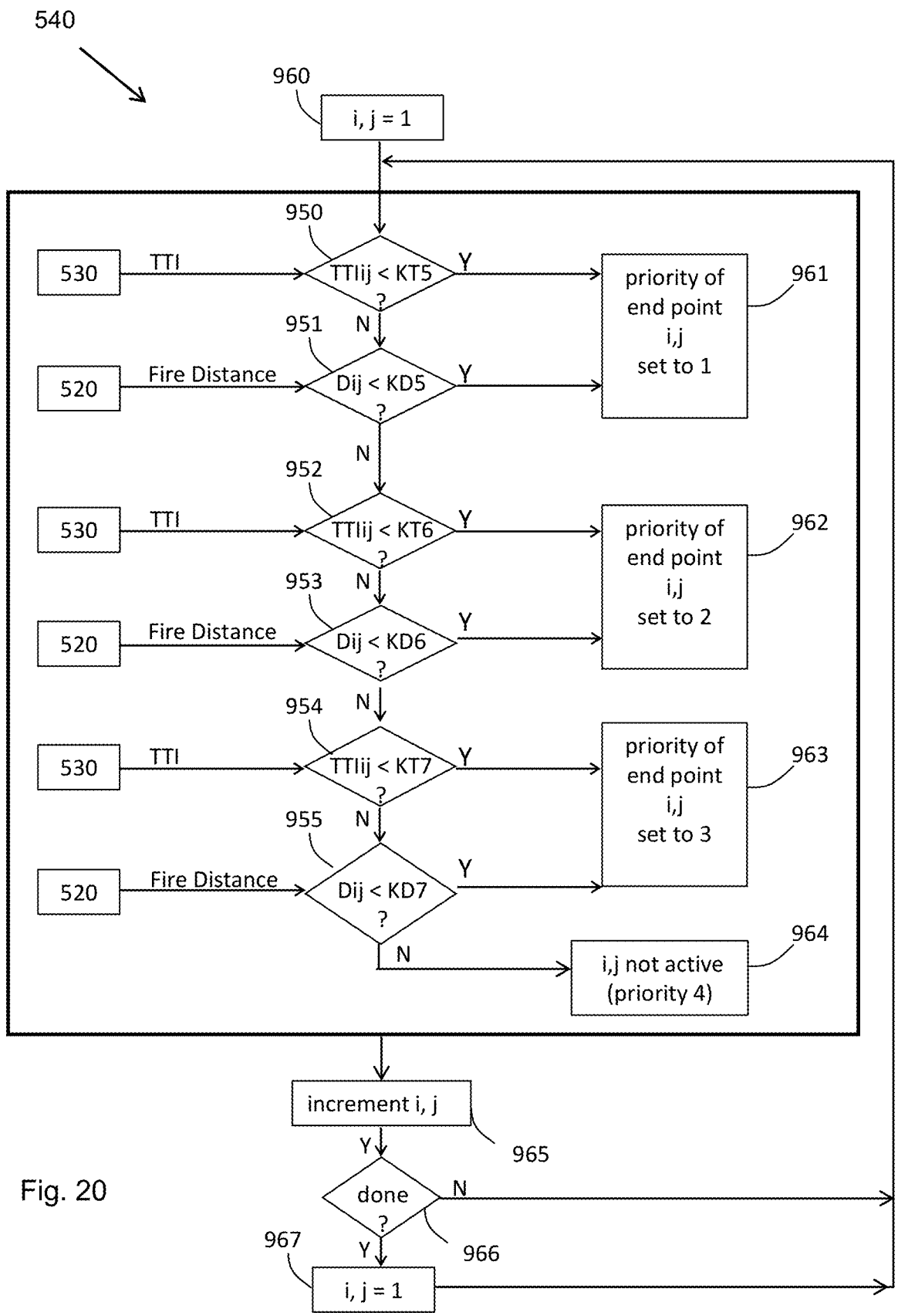

FIGS. 18-20 are flow charts of internal logic of step 540 of process 500. As described above, process 500 typically begins operating before a fire is imminent.

FIG. 18 shows steps of operation of step 540 that are performed while a fire risk is still relatively low, for example when cluster sensors have not yet sensed indications of a fire, because fires are still remote. At this stage, the most relevant data may be provided to the COFD application by the public data sources 700. This data may include meteorology data and information on an extent of fires that may pose a threat. Data from the cluster and endpoint sensors 300 and 210, as described above, may also be received. At step 931, the application applies this initial data to adjust thresholds for TTI, fire distance, and fire size. Thresholds are maintained by the COFD application for setting each mode of operation, as well as for each endpoint priority level. (Hereinbelow, prefixes of the TTI threshold, the distance threshold, and the size threshold are respectively given as KTi, KDi, KSi, where i represents a specific type of threshold for each mode and endpoint.) Step 931 may adjust the thresholds in order to change sensitivity of response, when greater sensitivity is warranted by the assessed remote risk.

Next, at a step 932, the current TTI (input from step 530) is compared to an initial time threshold KT1, i.e., a threshold for determining whether the COFD system should enter initial mode, which is described above. If the TTI is less than KT1, initial mode is started (step 936). If not, the fire distance is compared to the initial distance threshold KD1 (step 934) and to an initial fire size threshold KS1 (step 935). If these thresholds are met (the distance being less than KD1 and the size being greater than KS1), an initial mode is started. If not, the remote data does not indicate a threat. However, endpoint sensor data is also checked at steps 937 and 938. If there is a fire detected by sensors of an individual endpoint (which is not noted by public data sources or by the cluster/community sensors), then if the fire distance to the given endpoint is less than a distance threshold KD2 (a distance threshold for an isolated fire, compared at a step 937), and the fire size greater than a threshold KD2 (a size threshold for an isolated fire, compared at a step 938), then the COFD application may start an "isolated" mode of operation, activating the water gun of just the given endpoint (at a step 939).

FIG. 19 is a flow chart of steps performed by the COFD application to implement step 540 of process 510, in order to initiate the impact mode of operation.

At a step 942, an estimate of a fire's time-to-impact (TTI) with respect to the community is received from step 530 and is compared to a time threshold KT2. If the TTI is less than the threshold, the COFD application initiates impact mode operation (at a step 943). Similarly, if the fire distance and size warrant action, the distance being less than a distance threshold KD3 (step 945) and the size being greater than a size threshold KS3 (step 946), then the impact mode of operation is initiated. As described above, the COFD application typically makes a transition from the initial mode to a maintenance mode after a given period of time, which the application may modify if meteorological conditions (e.g., level of drought) warrant longer preventive watering for improving ignition resistance.

FIG. 20 is a flow chart of steps performed by the COFD application to implement step 540 of process 510, to determine endpoint priority levels for operation during the impact mode described above. FIG. 20 depicts an algorithm that may be implemented by the operations controller 500 that controls a community with multiple clusters. In such a configuration, the step 540 may include determination of priorities of all endpoints in all clusters. This process is represented by a logical loop that sequentially scans sensor data of each endpoint, for each cluster. (When process 510 is implemented in a distributed mode by endpoint or cluster processors, each processor typically determines priorities only for the set of endpoints in its own cluster.)

At a step 960, the endpoint priority process of step 540 is set to scan data with respect to a first endpoint (i), of a first cluster (j). The process subsequently increments each endpoint of the first cluster until all endpoints of the first cluster have been scanned, and proceeds in a similar manner to scan all endpoints of all clusters of the system.

For each endpoint of the system, the endpoint priority process tests the TTI (determined at step 530) and fire distance (determined at step 520) against respective TTI (KT) and fire distance thresholds (KD), performing the test for each of multiple levels of priority. FIG. 20 shows a configuration of four priority levels, but embodiments may be similarly configured for more or less priority levels. At steps 950 and 951, the TTI and distance are compared with the highest priority thresholds (i.e., priority 1), indicated respectively as KT5 and KD5. If either threshold criterion is met, the endpoint priority is set to 1 (at a step 961). If neither threshold criterion is met, the next lower priority is tested at respective steps 952 and 953, and if either of these criterion is met, priority 2 is set (at a step 962). If neither criterion is met, the next lower priority is tested at respective steps 954 and 955, and if either of these criterion is met, priority 3 is set (at a step 963). if these criteria are not met the lowest priority is set (at a step 964).

After setting priority for one endpoint, the process continues to loop through all endpoints of all clusters, incrementing the cluster/endpoint at a step 965, testing whether the last endpoint has been checked at a step 966, and if so, starting the process again at a step 967, such that the process of testing priorities is a dynamic and continuously operating process, like all steps of the general COFD application 510.

Figure 21A:
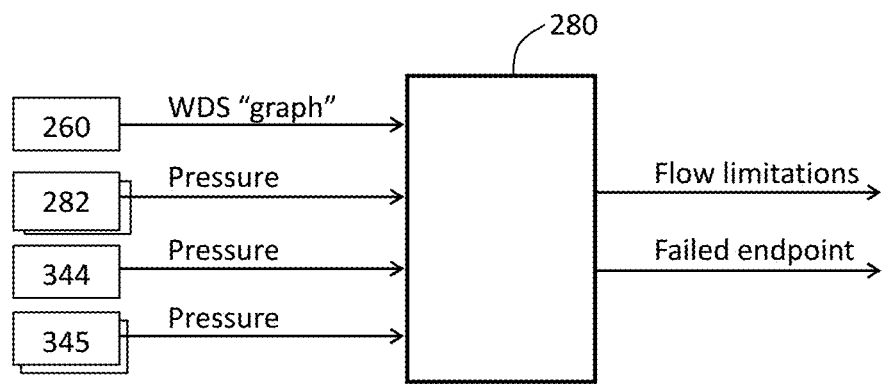
Figure 21B:
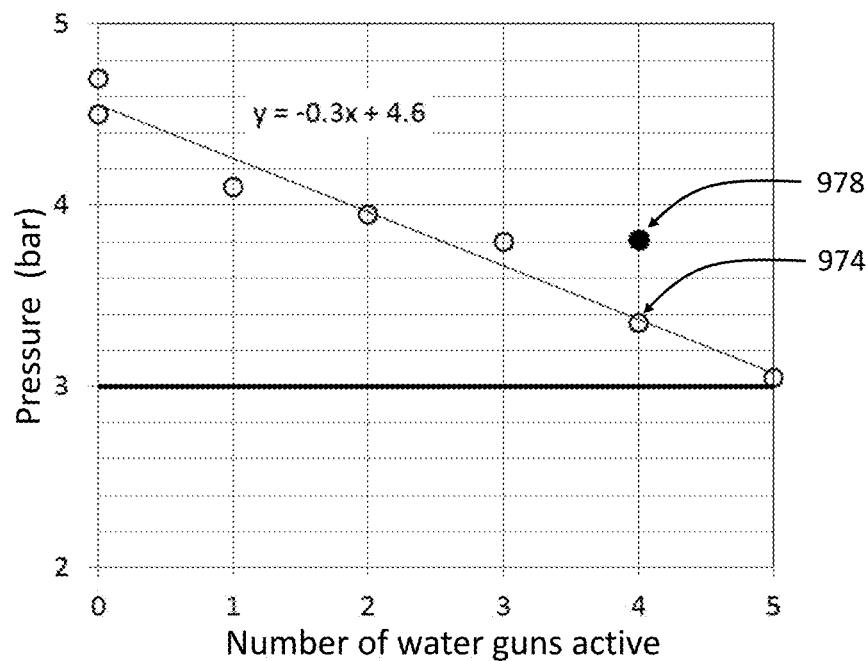

FIG. 21A shows input received at step 280 for determining endpoint limits, i.e., the maximum number of endpoint water guns that can be operated concurrently given the cluster water pressure. The process of step 280 receives water pressure readings from the pressure sensors 282, 344, and 345 as described above. The process of step 280 also receives (typically from a system operator through user interface 600) a graph or equation indicating a relationship between a number of water guns that are operated and water pressure of the water network. An example of such a graph is shown in FIG. 21B. The graph plots measured water pressure for increasing numbers of active water guns. In the example shown, a minimum water pressure needed to operate the water guns is 3 bar, and the maximum number of concurrent guns that may be operated is 5 water guns. An equation is shown indicating the approximately linear relationship between pressure and water gun use. Typically, such a graph is created by testing the system during installation. The purpose of the graph is to indicate the typical drop in water pressure due to activation of additional water guns. If for some reason the water pressure during operation is lower than expected for a given number of active water guns, the COFD application (at step 280) reduces the limit on the number of active water guns (at any given time slot) in order to ensure that the minimum water pressure is maintained. A drop in water pressure below the level indicated by the graph may mean, for example, that a manual firefighting action is being performed in parallel, which also requires water. A drop may also mean that a water gun valve of an endpoint has not closed properly and continues to operate. The COFD application at step 280 may also test water gun water pressure sensors 282 (described in FIG. 2) to detect discrepancies between actual and expected pressures, in order to determine endpoint failures. Endpoint failures are applied to the calculations of limits. Failures also typically trigger notifications to system operators.

Figure 22A:
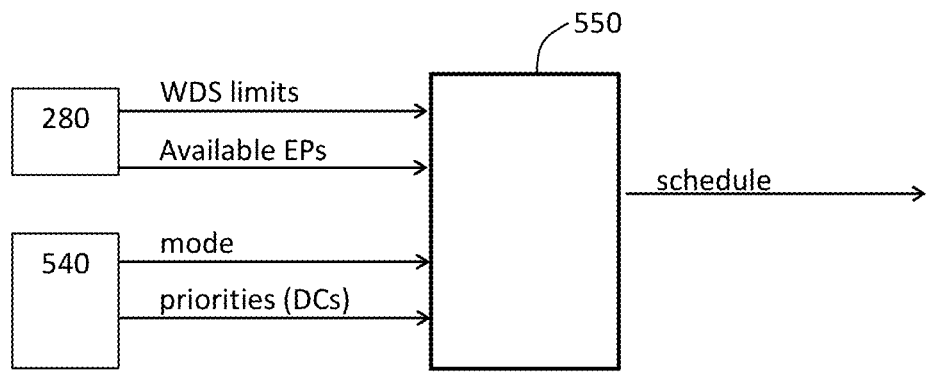

FIG. 22A shows input received at step 550 for determining the flow schedules for endpoints, i.e., the allocation of water flow of endpoints to time slots, as described above. Step 550 receives (from step 280) water supply pressure readings from the multiple pressure sensors 344 and 345, described above with respect to FIGS. 1-2. (Pressure data acquired at step 280 may also be incorporated.) The process performed at step 550 also receives (from step 540) the determination of operating mode, as well as endpoint priorities and the "relative duty cycle" values set according to the endpoint priorities. As described further hereinbelow with respect to FIG. 22B, the relative duty cycles may be modified to ensure that the limit on concurrent water gun operation is met.

Figure 22B:
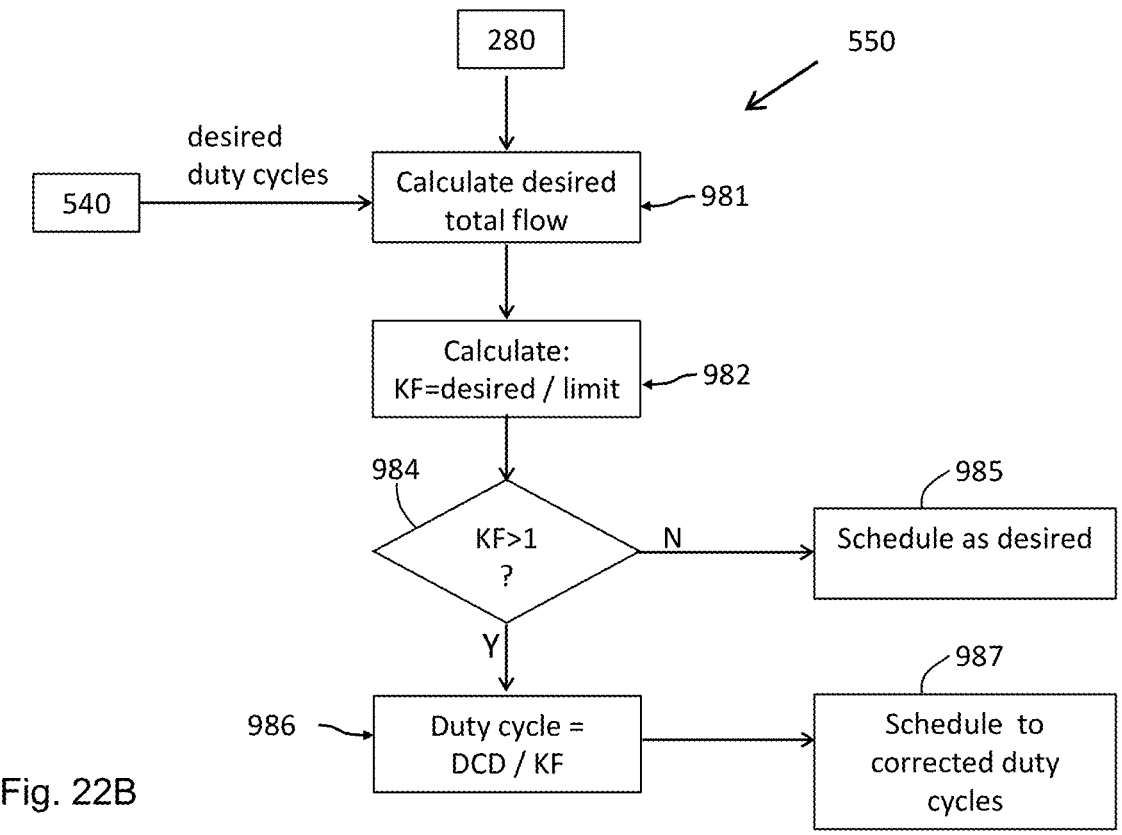

FIG. 22B is a flow chart of steps performed by the COFD application to implement step 550 of process 510. Step 280 provides limits on the number of endpoints of a cluster that can be operated concurrently. Step 540 provides the desired duty cycles, given the current fire risk. At a step 981, a desired total flow is calculated. At a step 982, a "k factor" is then calculated by dividing the desired total flow by the determined limit on total flow (this being equivalent dividing the desired number of concurrent water guns by the maximum limit on concurrent guns). If the k factor is less than one (as determined at a step 984), meaning the desired total flow is less than the limit, then the scheduling of water guns can be done according to the desired duty cycles (step 985). If the k factor is greater than one, then the desired duty cycles must be divided by the k factor for each endpoint, to generate corrected ("normalized") duty cycles that can be scheduled in time slots (step 987). In either case, scheduling may be performed as described above with respect to FIG. 14.

Figure 23:
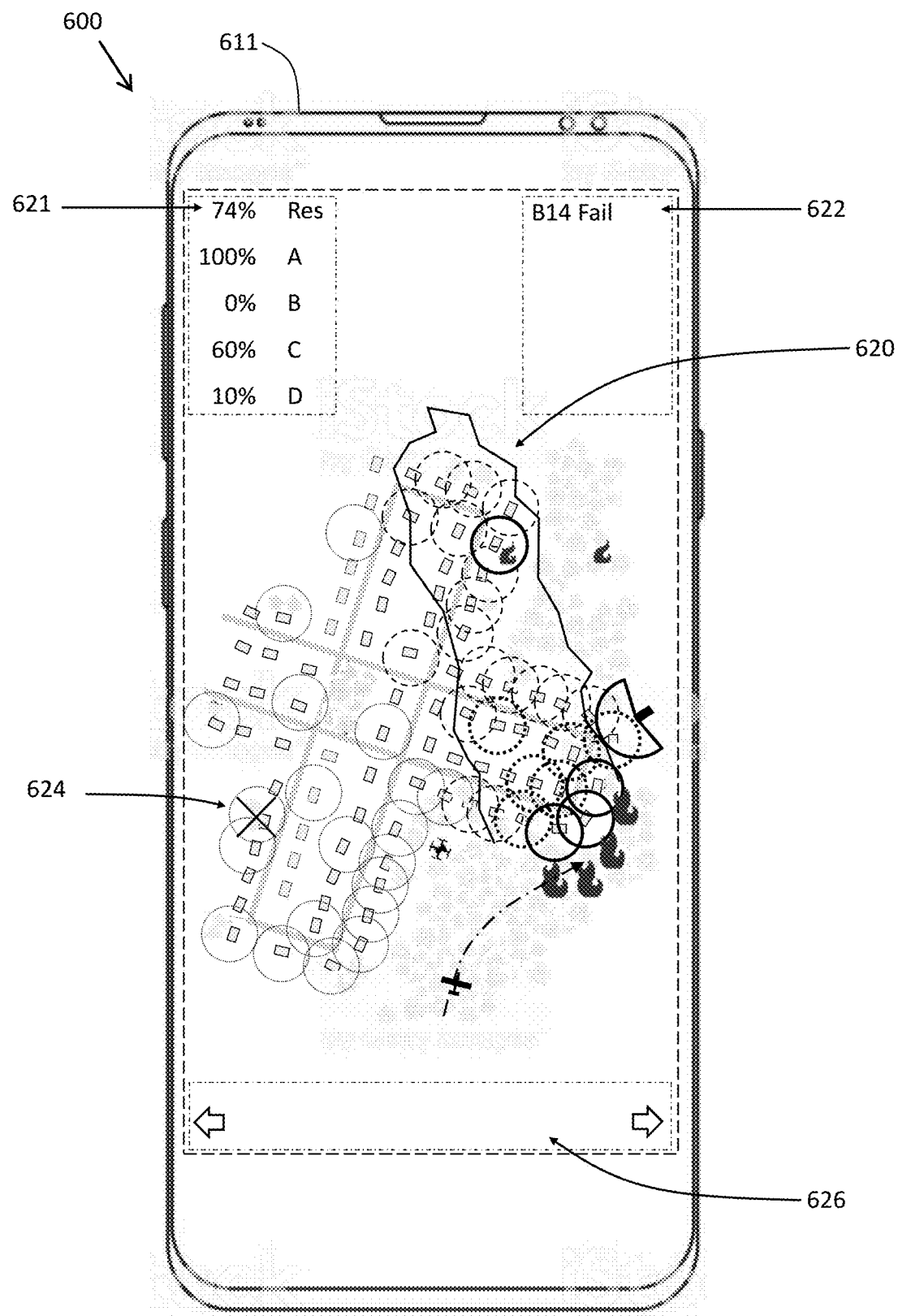
FIG. 23 is an example of a screen of the user interface provided with the COFD system, in accordance with an embodiment of the present invention.

FIG. 23 is an example of a screen of the user interface 600. As described above, different users may be provided with a user interface. Authorized users, such as a system operator, may have access to screens of the user interface permitting entering instructions to control aspects of the COFD application, including entering setup data, such as the pressure limit graph described above with respect to FIG. 21B above. Other users may receive monitoring information, which may include a tactical situation display (TSD) showing the community protected by the COFD system in relation to the fire. The figure shows such a TSD with a map 620, including symbols described above with respect to the community and the fire status. Fire status may include indicators of smoke and new ignition by sparks location. Observer UAV locations may also be indicated, as well as firefighting equipment, such as fire trucks and fire bomber locations and targets. Typically the maps and symbols are indicated in distinctive colors to distinguish between different symbols. Users can typically select which symbols to view.

The display may also show additional status information, such as a list 621 of fire threat levels of different clusters of the community, and a list 622 of identified endpoint failures. The endpoint failures may also be indicated by highlighting 624 on the map.

In general the user interface is designed to provide fire situation awareness, enabling all firefighting units to share the same fire status reference. Fire status indicators may be provided through the user interface, including fire, smoke and spark threat footprints and fire progress on the map or on aerial photos. Firefighting units may also use the interface to coordinate actions, as well as their positions.

The interface may also permit authorized users to manually update data on fire locations and size. Operators may also have authority to override automated actions, such as water gun scheduling and activation.

In addition to indicating water gun or valve failures, the user interface may also provide data on water pressures at the primary, secondary (i.e., cluster), and endpoint sensors. (Primary monitoring reflecting pressure gauges located on pipes of community water towers or reservoirs). When pressures are lower than preset thresholds, the COFD application may issue alerts to the user interfaces of appropriate users.

A screen for operator controls and notifications of failure may also be provided with respect to the fire suppression additive systems. Pressure of additive systems may be measured, and, if below a preset level, alerts may be generated. Alerts may also be issued for any sensors shown to fail (or if battery levels are low).

The COFD application may also track aggregate water usage, providing statistics on current and aggregate water usage to the user interface.

Additional aspects of firefighting resources management available on the user interface may include maps of access roads and controls for UAV operators. The COFD application may also apply a predictive model of firefighting to provide recommendations for optimal allocation of fire trucks. The objective is to increase firefighting power at optimal locations that also minimize risks to firefighters.

It should be noted that the user interface also includes standard interface controls, such as switching to other displays, zoom, camera control, etc. Additional control functions may include irrigation intensity options.

Unless otherwise defined, all technical and scientific terms used herein have the same meaning as commonly understood by one of ordinary skill in the art to which the invention pertains. In case of conflict, the specification, including definitions, takes precedence.

As used herein, the terms "comprising", "including", "having" and grammatical variants thereof are to be taken as specifying the stated features, integers, steps or components but do not preclude the addition of one or more additional features, integers, steps, components or groups thereof. As used herein, the indefinite articles "a" and "an" mean "at least one" or "one or more" unless the context clearly dictates otherwise.

As used herein, when a numerical value is preceded by the term "about", the term "about" is intended to indicate +/−10%. As used herein, a phrase in the form "A and/or B" means a selection from the group consisting of (A), (B) or (A and B). As used herein, a phrase in the form "at least one of A, B and C" means a selection from the group consisting of (A), (B), (C), (A and B), (A and C), (B and C) or (A and B and C).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Embodiments of methods and/or devices described herein may involve performing or completing selected tasks manually, automatically, or a combination thereof. Some methods and/or devices described herein are implemented with the use of components that comprise hardware, software, firmware or combinations thereof. In some embodiments, some components are general-purpose components such as general purpose computers, digital processors or oscilloscopes. In some embodiments, some components are dedicated or custom components such as circuits, integrated circuits or software.

For example, in some embodiments, some of an embodiment is implemented as a plurality of software instructions executed by a data processor, for example which is part of a general-purpose or custom computer. In some embodiments, the data processor or computer comprises volatile memory for storing instructions and/or data and/or a non-volatile storage, for example, a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results.

It is to be understood that all or part of the process described above may be controlled by a system implemented in digital electronic circuitry, or in computer hardware, firmware, software, or in combinations thereof. The computing system may have one or more processors and one or more network interface modules. Processors may be configured as a multi-processing or distributed processing system. Network interface modules may control the sending and receiving of data packets over networks. Security modules control access to all data and modules. All or part of the system and process can be implemented as a computer program product, tangibly embodied in an information carrier, such as a machine-readable storage device or in a propagated signal, for execution by, or to control the operation of, data processing apparatus, such as a programmable processor, computer, or deployed to be executed on multiple computers at one site or distributed across multiple sites. Memory storage may also include multiple distributed memory units, including one or more types of storage media.

Method steps associated with the system and process can be rearranged and/or one or more such steps can be omitted to achieve the same, or similar, results to those described herein. It is to be understood that the embodiments described hereinabove are cited by way of example, and that the present invention is not limited to what has been particularly shown and described hereinabove. Rather, the scope of the present invention includes variations and modifications thereof which would occur to persons skilled in the art upon reading the foregoing description and which are not disclosed in the prior art.

The invention claimed is:

1. A computer-based method for community outdoor fire protection comprising:
   A) receiving indicators of a current fire, and responsively determining a level of a current fire risk for each of multiple endpoints, wherein each endpoint includes a water gun and an associated electrical water valve, wherein a predetermined minimum water pressure is specified for operation of each water gun, wherein each electrical water valve connects to a shared water source;
   B) according to the current fire risk of each endpoint, determining a relative duty cycle for operating each endpoint;
   C) receiving a water pressure measurement of the shared water source and, responsively to the water pressure measurement and to the predetermined minimum water pressure specified for each endpoint operation, determining a maximum number of concurrent endpoints to operate;
   D) according to the maximum number of operational endpoints and the relative duty cycles of each endpoint, allocating operation of each endpoint to time slots; and
   E) responsively operating the electrical water valve of each of the multiple endpoints according to its time slot allocation.

2. The method of claim 1, wherein the shared water source is a cluster water source of a first cluster, wherein the first cluster is one of multiple clusters receiving water from a shared primary water distribution system (WDS) and further comprising determining a limit of a WDS water pressure and responsively merging the multiple clusters to allocate operation of each endpoint of the multiple clusters to time slots.

3. The method of claim 1, wherein allocating operation of each endpoint to a time slot further comprises allocating operation according to a maximum time limit between periods of operation.

4. The method of claim 1, further comprising receiving new indicators of a current fire, responsively determining new relative duty cycles, and responsively re-allocating operation of each endpoint to the time slots of operation.

5. The method of claim 1, further comprising receiving a new water pressure measurement, responsively determining new relative duty cycles, and responsively re-allocating operation of each endpoint to the time slots of operation.

6. The method of claim 1, wherein receiving indicators of the current fire comprises receiving data on a location of the current fire with respect to geographic coordinates of the endpoints, and wherein determining the current fire risk of each endpoint comprises determining the risk as a function of distance to the current fire.

7. The method of claim 1, wherein receiving indicators of the current fire comprises receiving data on fuel, topography, and one or more types of meteorological data including temperature, humidity, wind speed, and direction, and wherein determining the current fire risk of each endpoint comprises determining the risk by applying the indicators to a fire prediction model.

8. The method of claim 1, wherein steps of the method are performed by a remote processor.

9. The method of claim 1, wherein steps of the method are performed by dedicated processors associated with each endpoint.

10. The method of claim 1, wherein each endpoint further includes a source of additive, and wherein the method further comprises operating the additive source to add the additive to water flow of an endpoint.

11. The method of claim 1, further comprising providing operational data with respect to the endpoints to one or more monitoring devices comprising at least one of a smartphone, a computer tablet, a cellular phone, a desktop computer, or a laptop computer.

12. The method of claim 11, wherein providing the operational data includes providing a real-time aggregate measure of water consumption.

13. The method of claim 1, further comprising providing a control interface to one or more control devices, and receiving from the control interface an instruction to alter a current fire risk of one or more of the endpoints.

14. The method of claim 1, wherein the relative duty cycle is proportional to the current fire risk.

15. The method of claim 1, wherein the current fire risk of the endpoints is a numerical value that ranges from a first value indicative of a smallest risk of the endpoint catching fire, up to a highest value of the range indicative of a high risk of the endpoint catching fire.

16. The method of claim 1, wherein a period of a time slot is a time of a 360 degree revolution of the water guns.

17. A system for community outdoor fire protection (COFD) comprising one or more processors having associated non-transient memory storage, wherein the memory storage includes instructions that when implemented by the one or more processors execute steps comprising:
   A) receiving indicators of a current fire, and responsively determining a level of a current fire risk for each of multiple endpoints, wherein each endpoint includes a water gun and an associated electrical water valve, wherein a predetermined minimum water pressure is specified for operation of each water gun, wherein each electrical water valve connects to a shared water source;
   B) according to the current fire risk of each endpoint, determining a relative duty cycle for operating each endpoint;
   C) receiving a water pressure measurement of the shared water source and, responsively to the water pressure measurement and to the predetermined minimum water pressure specified for each endpoint operation, determining a maximum number of concurrent endpoints to operate;
   D) according to the maximum number of operational endpoints and the relative duty cycles of each endpoint, allocating operation of each endpoint to time slots; and
   E) responsively operating the electrical water valve of each of the multiple endpoints according to its time slot allocation.

* * * * *